US008300163B2

(12) United States Patent
Uno

(10) Patent No.: US 8,300,163 B2
(45) Date of Patent: Oct. 30, 2012

(54) DISPLAY PANEL, DISPLAY DEVICE, AND TELEVISION RECEIVER

(75) Inventor: Takaya Uno, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 116 days.

(21) Appl. No.: 13/059,613

(22) PCT Filed: Jun. 11, 2009

(86) PCT No.: PCT/JP2009/060664
§ 371 (c)(1),
(2), (4) Date: Feb. 17, 2011

(87) PCT Pub. No.: WO2010/024016
PCT Pub. Date: Mar. 4, 2010

(65) Prior Publication Data
US 2011/0149178 A1    Jun. 23, 2011

(30) Foreign Application Priority Data
Aug. 28, 2008    (JP) ................................. 2008-220358

(51) Int. Cl.
*G02F 1/1343* (2006.01)
(52) U.S. Cl. .......................................... 349/38; 349/39
(58) Field of Classification Search ............... 349/38–39
See application file for complete search history.

(56) References Cited

U.S. PATENT DOCUMENTS

| 5,943,106 A | 8/1999 | Sukenori et al. |
| 6,259,494 B1 | 7/2001 | Kawai et al. |
| 2001/0022366 A1 | 9/2001 | Kawai et al. |

FOREIGN PATENT DOCUMENTS

| JP | 10-232408 A | 9/1998 |
| JP | H11-38449 A | 2/1999 |
| JP | 2003-107526 A | 4/2003 |
| JP | 2005-208305 A | 8/2005 |
| WO | 2007/043399 A1 | 4/2007 |

OTHER PUBLICATIONS

International Search Report (ISR) issued in PCT/JP2009/060664 (International application) mailed in Jul. 2009 for Examiner consideration.

*Primary Examiner* — Phu Vu
(74) *Attorney, Agent, or Firm* — Chen Yoshimura LLP

(57) ABSTRACT

A liquid crystal panel (11) includes, on an element substrate (20); a source wire (24); a gate wire (25) intersecting with the source wire (24); a TFT (27) arranged in the vicinity of the intersection of the source wire (24) and the gate wire (25); a pixel electrode (28) connected to the TFT (27); a capacitance wire (26) arranged in parallel with the gate wire (25) so as to form a capacitance between the capacitance wire (26) and the pixel electrode (28); a branch wire (36) branching off from the capacitance wire (26) and arranged parallel to the source wire (24) so as to overlap at least partially the source wire (24) through a gate insulating film (31); and an auxiliary wire (39) disposed between the branch wire (36) and the gate wire (25) and arranged in parallel with the source wire (24) so as to overlap at least partially the source wire (24) through the gate insulating film (31).

18 Claims, 22 Drawing Sheets

DISPLAY PANEL, DISPLAY DEVICE, AND TELEVISION RECEIVER

TECHNICAL FIELD

The present invention relates to a display panel, a display device, and a television receiver.

BACKGROUND ART

Conventionally, a liquid crystal panel used for a liquid crystal display device is composed of a liquid crystal layer held between a pair of glass substrates, and one of the glass substrates is configured as an active matrix substrate having pixel electrodes. The active matrix substrate has a structure in which gate lines and signal lines are disposed in a grid pattern on the active matrix substrate and switching elements such as TFTs are provided at the intersections of the gate lines and signal lines. A pixel electrode disposed in a region enclosed by the gate lines and the signal lines constitutes a pixel which is a unit of display. In recent years, in order to stabilize a voltage applied to the liquid crystal material, a capacitance wire that forms a capacitance between the pixel electrode and itself is disposed in parallel with the gate wire.

One problem with the liquid crystal panel configured as described above is that when a signal wire breaks at a point, for example, data signal cannot be supplied beyond that point, which significantly lowers the display quality. Technologies disclosed in Patent Documents 1 and 2 are known examples of the solution for this problem.

According to the configuration described in Patent Document 1, a back-up wire is disposed parallel to the signal wire and overlaps the signal wire over the entire length through an insulating layer therebetween. With the auxiliary wire in place, a breakage in a signal wire is repaired by irradiating the signal wire and the back-up wire with a laser and short-circuiting them.

According to the Patent Document 1, back-up wires must be separately provided in addition to other wires. On the other hand, Patent Document 2 discloses a structure in which branch wire branches off from the capacitance wire and is arranged parallel to the signal wire. Part of the branch wire overlaps the signal wire through an insulating layer disposed therebetween. With this configuration, when a signal wire breaks, the branch wire is cut off from the capacitance wire and the portion that overlaps with the signal wire is short-circuited. That is, the branch wire is used as a bypass for the signal wire. In other words, according to Patent Document 2, broken signal wires are repaired by utilizing the branch wires that are a part of the existing structure.

Related Art Documents

Patent Documents

Patent Document 1: Japanese Patent Application Laid-Open Publication No. 2003-107526
Patent Document 2: Japanese Patent Application Laid-Open Publication No. H11-38449

Problems to be Solved by the Invention

According to Patent Document 2, a great enough distance needs to be provided between the branch wire and the gate wire. The reason is that if the branch wire and the gate wire are designed to be disposed close to each other, any misalignment in the range or location of disposing the branch wire or gate wires, for example, due to a problem in the manufacturing process, the probability that short-circuit occurs between the branch wires and the gate wires increases, which leads to a higher product defect rate.

However, if a great enough distance is provided between the branch wire and the gate wire, there arises another problem that a breakage in a portion of the signal wire that is located between the branch wire and the gate wire cannot be repaired. This problem has not been solved yet.

SUMMARY OF THE INVENTION

The present invention has been completed in consideration of the current situation as described above and is aiming at reducing the product defect rate.

Means for Solving the Problems

The display panel of the present invention includes a substrate having thereon: signal wires; gate wires arranged to intersect with the signal wires; switching elements provided in the vicinity of the intersections between the signal wires and the gate wires; pixel electrodes connected to the switching elements; capacitance wires arranged in parallel to the gate wires and forming a capacitance between themselves and the pixel electrodes; branch wires branching off from the capacitance wires, arranged in parallel to the signal wires, and partially overlapping the signal wires through an insulating film; and auxiliary wires disposed between the branch wires and the gate wires, arranged in parallel to the signal wires, and at least partially overlapping the signal wires through an insulating film.

In the configuration described above, if the signal wire breaks at a point where the branch wire is formed, the branch wire is cut off and isolated from the capacitance wire, and a portion of the branch wire that overlaps the signal wire is short-circuited. This way, the branch wire is utilized as a bypass for the signal wire, and the broken signal wire is repaired. If the signal wire breaks at a point between the branch wire and the gate wire, a portion of the auxiliary wire that overlaps the signal wire is short-circuited. This way, the auxiliary wire is utilized as a bypass for the signal wire, and the broken signal wire is repaired. As a result, occurrence of product defect due to the broken signal wire is prevented.

The auxiliary wire is disposed between the branch wire branching off from the capacitance wire and the gate wire, and a great enough distance is provided between the branch wire and the gate wire. Therefore, even if a problem such as misalignment occurs in the formation of gate wires and branch wires due to some issues in manufacturing, problems such as direct short-circuiting between the branch wire and the gate wire are unlikely to occur. Here, short-circuit problems caused by the auxiliary wire are extremely unlikely to occur, since the auxiliary wire does not cause a short-circuiting between the branch wire and the gate wire unless the auxiliary wire short-circuits to both the branch wire and the gate wire. This configuration, therefore, can prevent the occurrence of product defect caused by short-circuits between the branch wire and the gate wire.

As embodiments of the present invention, the following configurations are preferred:

(1) The auxiliary wire is composed of a pair of signal wire overlap portions, which overlaps the signal wire through an insulating layer, and a signal wire non-overlap portion, which connects the signal wire overlap portions together and does not overlap the signal wire. For the purpose of inspecting whether or not there is a breakage in the signal wire, a substrate may be configured to have transmissive properties, so that any breakages in signal wires can be visually identified through such substrate. In this case, the auxiliary wire is unlikely to interfere with the visual inspection of the signal wire because the signal wire non-overlap portion of the auxiliary wire does not overlap the signal wire. This provides great workability in the inspection process. This configuration is especially beneficial when the auxiliary wire is formed of a metallic material that has light-shielding properties.

Additionally, this configuration minimizes a capacitance that may be formed between the auxiliary wire and the signal wire, and therefore prevents any influence the capacitance might have on the displayed image.

(2) The auxiliary wire includes the pair of signal wire non-overlap portions that sandwiches the signal wire in between. With this configuration, the auxiliary wire as a whole is substantially loop-shaped, and provides two separate bypass routes for the signal wire. Therefore, if a breakage occurs in one of the signal wire non-overlap portions, the signal wire can still be repaired without fail using the other signal wire non-overlap portion.

(3) The auxiliary wire is formed in a symmetric shape with respect to the signal wire as the symmetry axis. With the symmetric shape, when an electric field is generated between the signal wire and the auxiliary wire, the electric field takes on a symmetric form. Therefore, any influence that the electric field might have on the portion of the pixel electrode that is in proximity of the signal wire is "balanced." That is, the electric field does not cause uneven effects on the displayed image and good image quality is maintained.

(4) The auxiliary wire is formed in the same layer as the branch wire over the substrate and is disposed so as not to overlap the branch wire. With this configuration, the positional relationships between the branch wire and the signal wire and between the auxiliary wire and the signal wire in the direction of layers are equal. Therefore, when a laser beam is used to short-circuit the overlapped portion of the signal wire and the branch wire or to short-circuit the overlapped portion of the signal wire and the auxiliary wire, the same conditions for short-circuiting, such as the laser output and laser irradiation period, can be used. This provides great workability in the short-circuiting process.

(5) The auxiliary wire is formed of the same material as the branch wire. Using the same material allows the auxiliary wire to be formed in the same process as the branch wire during manufacturing process, which improves the production efficiency.

(6) The auxiliary wire is arranged so as not to overlap the pixel electrode. This configuration minimizes the capacitance that could be formed between the auxiliary wire and the pixel electrode, and reduces the influence of the capacitance on the displayed image.

(7) The branch wire is composed of a pair of signal wire overlap portions, which overlaps the signal wire through an insulating layer, and a signal wire non-overlap portion, which connects the signal wire overlap portions together and does not overlap the signal wire. For the purpose of inspecting whether or not there is a breakage in the signal wire, a substrate may be configured to have transmissive properties, so that any breakages in the signal wire can be visually identified through such substrate. In this case, the branch wire is unlikely to interfere with the visual inspection of the signal wire because the signal wire non-overlap portion of the branch wire does not overlap the signal wire. This provides great workability in the inspection process. This configuration is especially beneficial when the branch wire is formed of a metallic material that has light-shielding properties.

Additionally, this configuration minimizes a capacitance that may be formed between the branch wire and the signal wire, and therefore prevents any influence the capacitance might have on the displayed image.

(8) The signal wire non-overlap portion of the branch wire is arranged so as to overlap the pixel electrode. With this configuration, a capacitance is formed between the signal wire non-overlap portion of the branch wire that originates from the capacitance wire and the pixel electrode.

Here, a capacitance is formed between the gate wire and the pixel electrode, and also between the signal wire and the pixel electrode. Therefore, if the potential of the gate wire or the signal wire changes when the pixel electrode is charged and the switching element is not conductive, the potential of the pixel electrode could also change. The size of the potential change of the pixel electrode tends to be inversely proportional to the size of the capacitance formed between the capacitance wire and the pixel electrode. Therefore, by forming the capacitance between the signal wire non-overlap portion of the branch wire, which originates from the capacitance wire, and the pixel electrode, the capacitance formed between the capacitance wire and the pixel electrode can be increased accordingly. This way, variations in the potential of the pixel electrode can be suppressed, and the displayed image quality is improved.

(9) The branch wire has the pair of the signal wire non-overlap portions that sandwiches the signal wire in between. With this configuration, the branch wire as a whole is substantially loop-shaped, and provides two separate bypass routes for the signal wire. Therefore, if a breakage occurs in one of the pair of signal wire non-overlap portions, the signal wire can still be repaired without fail using the other signal wire non-overlap portion.

(10) The branch wire is formed in a symmetric shape with respect to the signal wire as the symmetry axis. With the symmetric shape, when an electric field is generated between the signal wire and the branch wire, the electric field takes on a symmetric form. Therefore, any influence that the electric field might have on the portion of the pixel electrode that is in proximity of the signal wire is "balanced." That is, the electric field does not cause uneven effects on the display and good image quality is maintained.

(11) The aforementioned substrate and an opposite substrate hold a liquid crystal layer in between. Here, since a liquid crystal panel is used as the display panel, the display panel can be used for displays for television receivers and personal computers. This display panel is especially suitable for a large-size display screen.

(12) On the opposite substrate, a plurality of color filters are disposed so as to overlap the pixel electrode and a light-shielding layer is disposed between the respective color filters. Also, the auxiliary wire is arranged so as not to overlap the color filters, but to overlap the light-shielding layer. In this configuration, unlike the configuration in which the auxiliary wire is arranged so as to overlap the color filters, for example, the auxiliary wire does not interfere with light passage through the color filters, and therefore good image quality is maintained.

(13) The auxiliary wire is made of a material that has light-shielding properties. Therefore, any film defect, for example, in the light-shielding layer on the opposite substrate can be covered by the auxiliary wire made of a material that has light-shielding properties.

(14) On the opposite substrate, a plurality of color filters are disposed so as to overlap the pixel electrodes, and a light-shielding layer is disposed between the respective color filters. Also, the branch wires are arranged so as not to overlap the color filters, but to overlap the light-shielding layer. In this configuration, unlike the configuration in which the branch wires are arranged so as to overlap the color filters, for example, the branch wires do not interfere with light passage through the color filters, and therefore good image quality is maintained.

(15) The branch wire is made of a material that has light-shielding properties. Therefore, any film defect, for example, in the light-shielding layer on the opposite substrate can be covered by the branch wire made of a material that has light-shielding properties.

Also, to solve the aforementioned problems, a display device of the present invention is composed of the display panel described above and an illumination device capable of radiating light to the display panel. The manufacturing cost of this display device can be lowered since the aforementioned display panel has a low defect rate.

Also, to solve the aforementioned problems, a television receiver of the present invention has the display device described above. The manufacturing cost of this television receiver can be lowered since the manufacturing cost of the aforementioned display device can be reduced.

Effects of the Invention

The present invention reduces the product defect rate.

Figure 1:
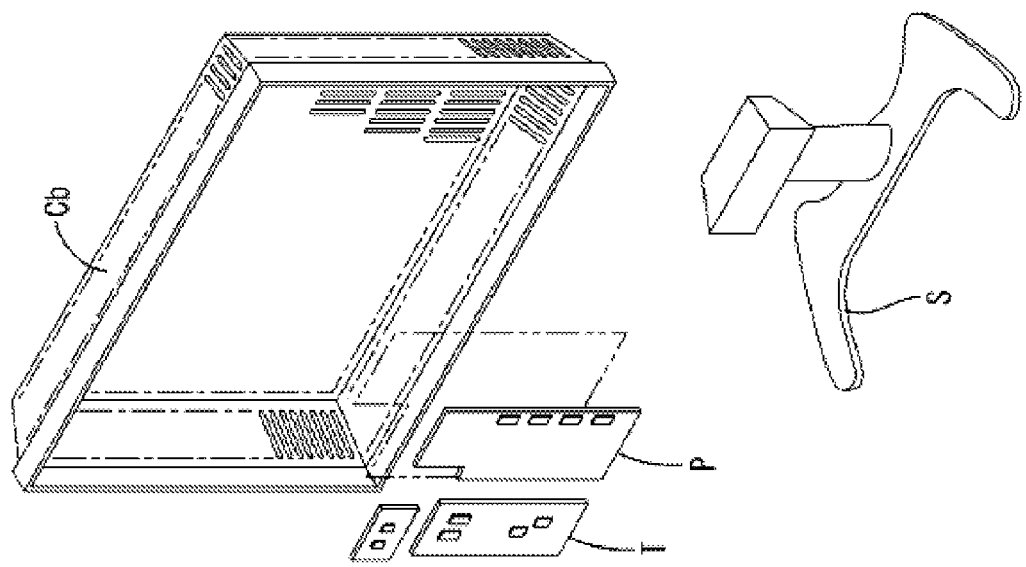
FIG. 1 is an exploded perspective view of the television receiver according to Embodiment 1 of the present invention, which schematically shows the configuration thereof.
Figure 1:
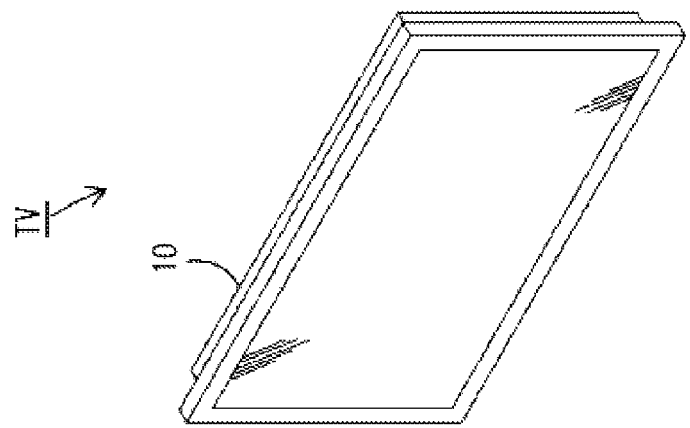
Figure 1:
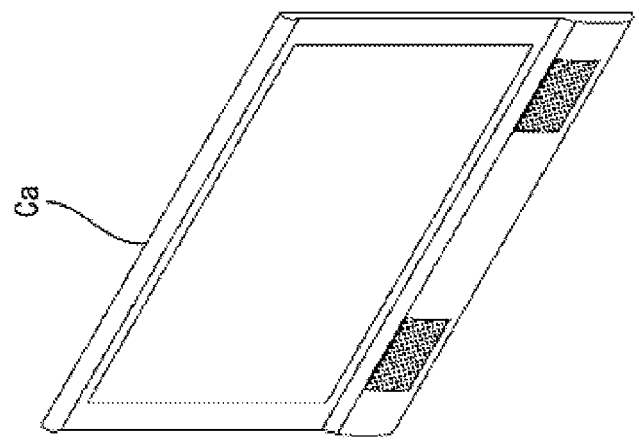

DESCRIPTION OF REFERENCE CHARACTERS 10 liquid crystal display device (display device)
11 liquid crystal panel (display panel)
12 backlight device (illumination device)
20 element substrate (substrate)
21 opposite substrate
24 source wire (signal wire)
25 gate wire
26 capacitance wire
27 TFT (switching element)
28 pixel electrode
31 gate insulating film (insulating layer)
33 color filter
34 light-shielding layer
26 branch wire
37 source wire overlap portion (signal wire overlap portion)
38 source wire non-overlap portion (signal wire non-overlap portion)
39 auxiliary wire
40 source wire overlap portion (signal wire overlap portion)
41 source wire non-overlap portion (signal wire non-overlap portion)
TV television receiver

DETAILED DESCRIPTION OF PREFERRED EMBODIMENTS

Embodiment 1

Figure 2:
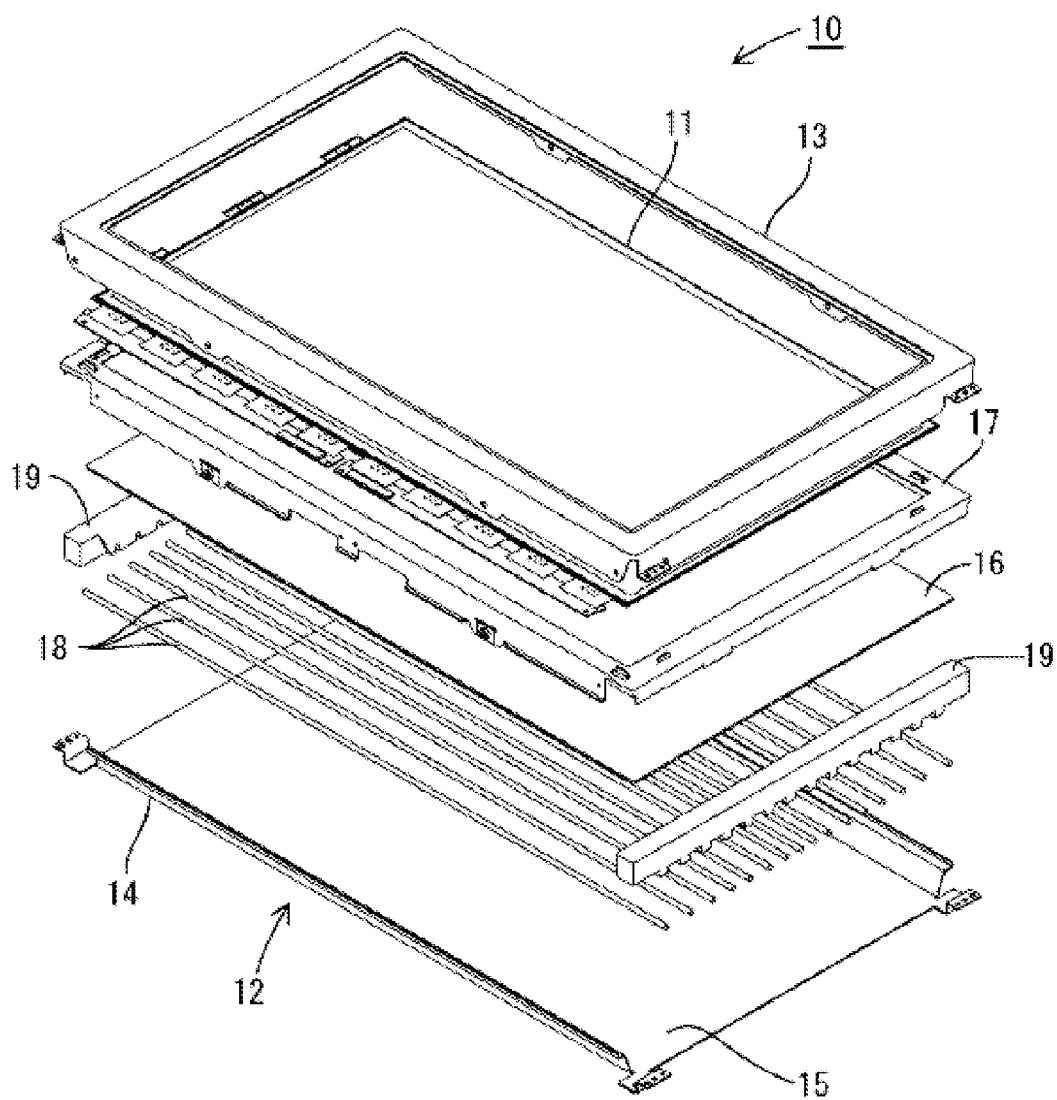
FIG. 2 is an exploded perspective view of a liquid crystal display device provided in a television receiver, which schematically shows the configuration thereof.
Figure 3:
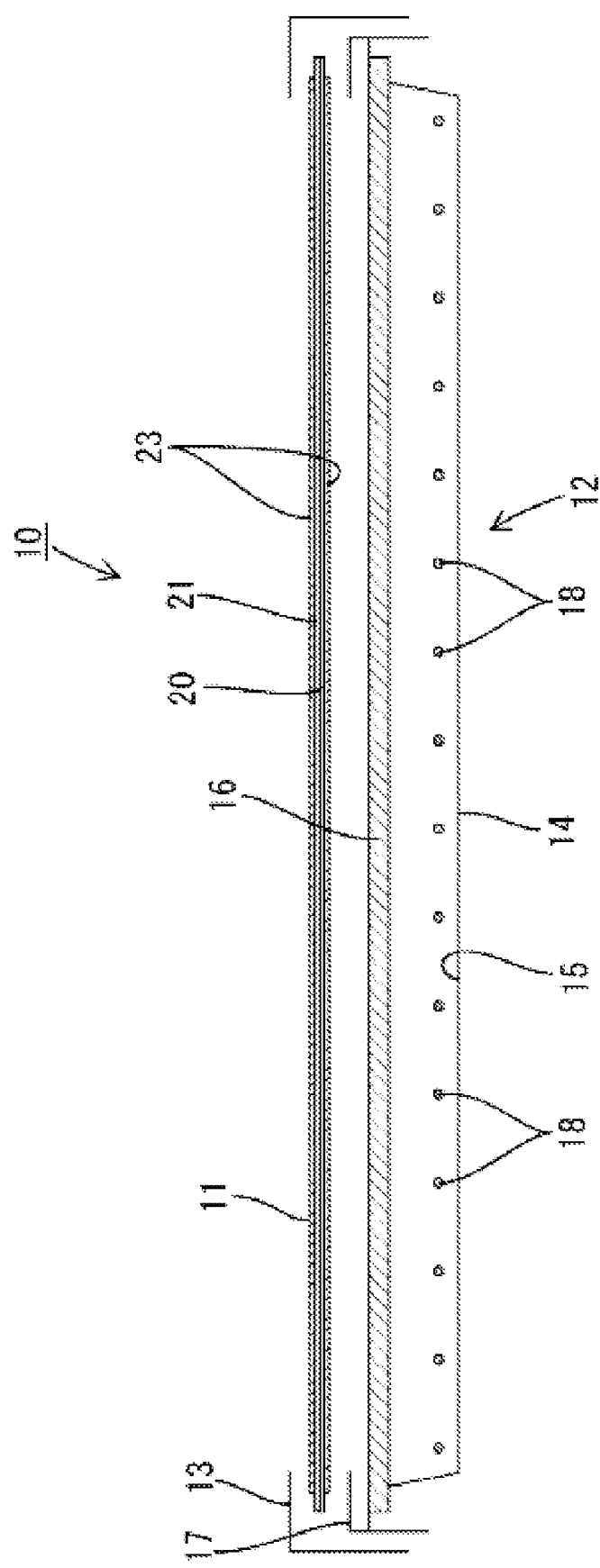
FIG. 3 is a side cross-sectional view of the liquid crystal display device taken along the line extending in the long side direction.

Embodiment 1 of the present invention is described below with reference to FIGS. 1 through 12. In the description of this embodiment, a liquid crystal display device 10 equipped with a liquid crystal panel 11 is used as an example. Here, the upper side in FIG. 3 is the front side of the liquid crystal panel and the lower side in FIG. 3 is the back side of the liquid crystal panel.

As shown in FIG. 1, the television receiver according to this embodiment includes a liquid crystal display device 10 (display device), front and back cabinets Ca and Cb that sandwich and encase the liquid crystal display device 10, a power supply P, a tuner T, and a stand S. The liquid crystal display device 10 as a whole takes a horizontally-long rectangular shape and is equipped with a liquid crystal panel 11, which is a display panel of rectangular shape when observed in a plan view, and also equipped with a backlight device 12 (illumination device) as an external light source, as shown in FIGS. 2 and 3. These components are integrally supported by a bezel 13, for example.

First, a general configuration of the backlight device 12 is described below. The backlight device 12 is a so-called direct lighting device, whose light source is disposed directly behind the liquid crystal panel 11. The backlight device 12 is composed of a chassis 14, the open side of which faces the front side (the side the light exits from; the side facing the liquid crystal panel 11); a reflective sheet 15 laid inside the chassis 14; an optical member 16 attached to an opening portion of the chassis 14; a frame 17 securing the optical member 16; a plurality of cold cathode fluorescent lamps 18 (light source) held in parallel with each other within the chassis 14; and a lamp holder 19, which is reflective and covers the end portions of the cold cathode fluorescent lamps 18 to block the light.

Figure 6:
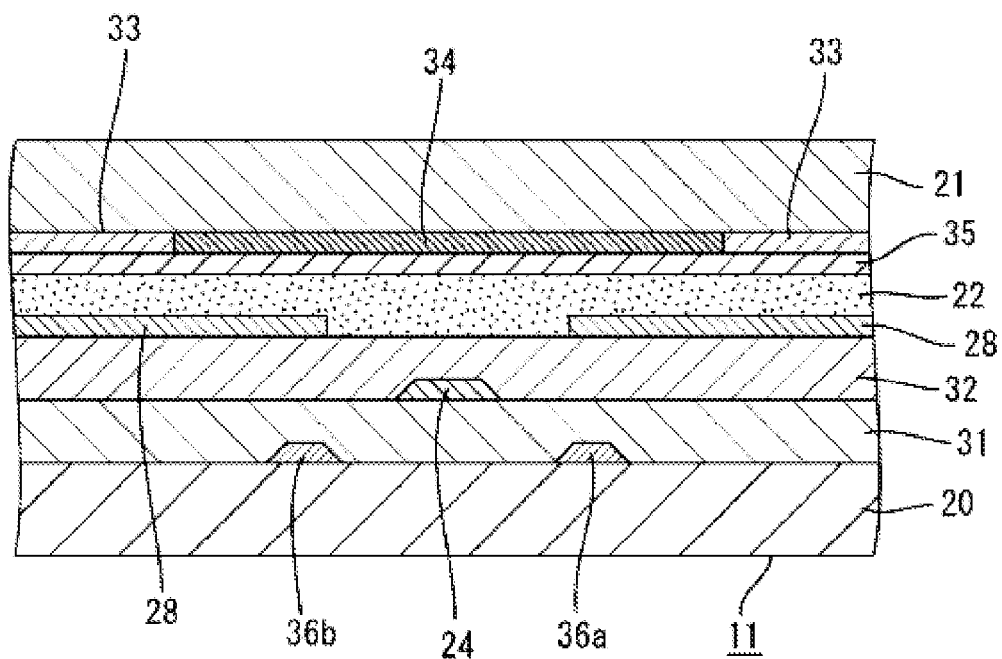
FIG. 6 is a cross-sectional view of the liquid crystal panel taken along the line vi-vi of FIG. 5.

Next, a liquid crystal panel 11 is described below. A liquid crystal panel 11 according to this embodiment is a MVA (Multi-domain Vertical Alignment) type liquid crystal panel, which provides a wide viewing angle. As shown in FIG. 6, the liquid crystal panel 11 is composed of a pair of substrates 20 and 21, which are made of glass and are transparent (transmissive), and a liquid crystal layer 22, which contains a liquid crystal material whose optical characteristics change according to the electric field applied. Of the substrates 20 and 21, the one disposed at the back (toward the backlight device 12) is referred to as "element substrate 20" (active matrix substrate; array substrate), and the one disposed in the front (the light exit side of the element substrate 20) is referred to as "opposite substrate 21" (CF substrate). A pair of front and back polarizers 23 are bonded to the outside surfaces of the substrates 20 and 21, respectively (see FIG. 3). In the following description, expressions such as "to overlap" or "not to overlap" (or "to offset") are used to describe the conditions of the liquid crystal panel 11 observed in a plan view unless otherwise stated. That is, an expression such as "to overlap" means to overlap in the direction of the thickness of the liquid crystal panel 11 (the coupling direction of the substrate 20 and the substrate 21), and an expression such as "to not overlap (or to offset)" means to not cover in the direction of the thickness of the liquid crystal panel 11.

Figure 4:
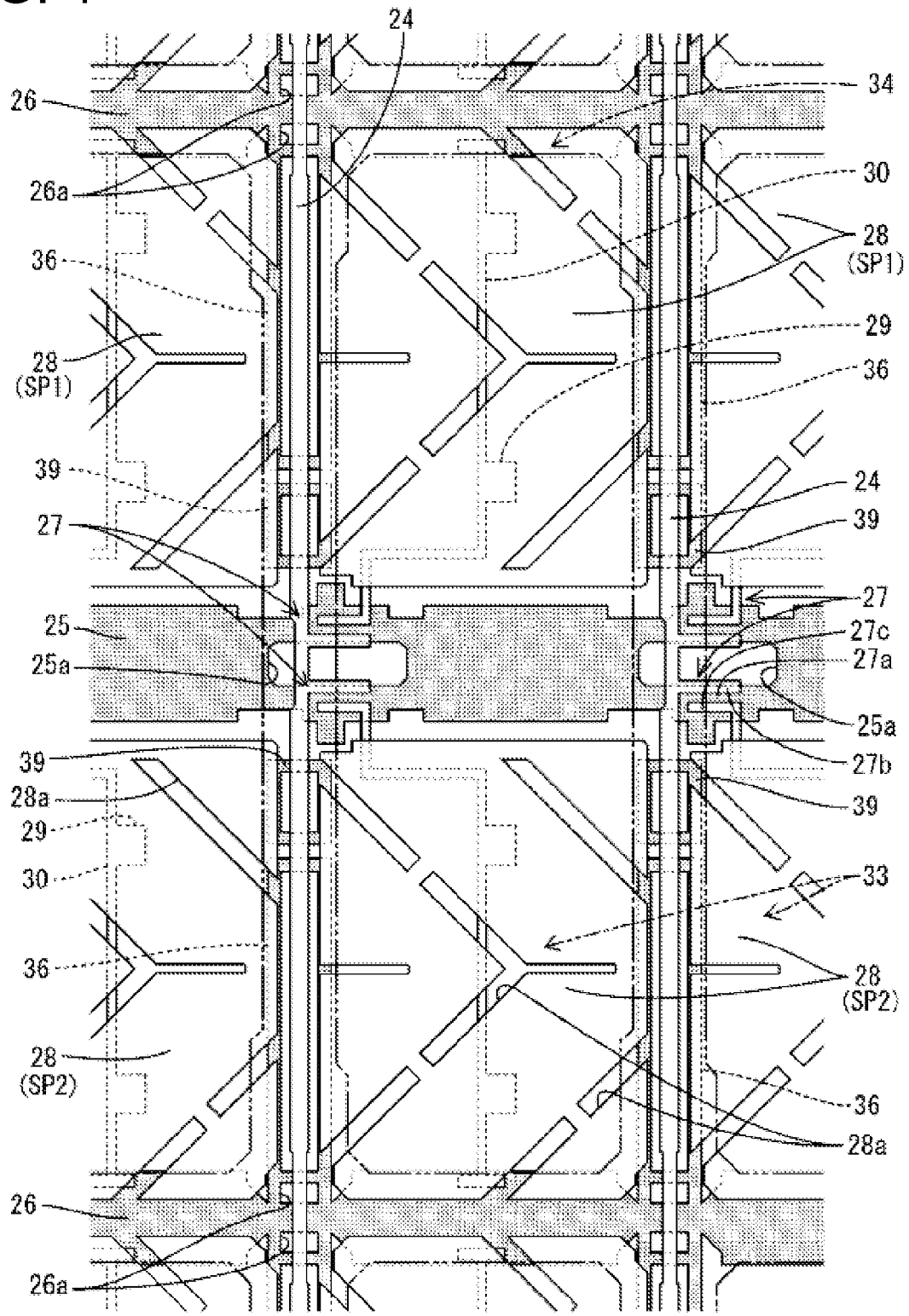
FIG. 4 is a plan view that illustrates a configuration of the element substrate.
Figure 5:
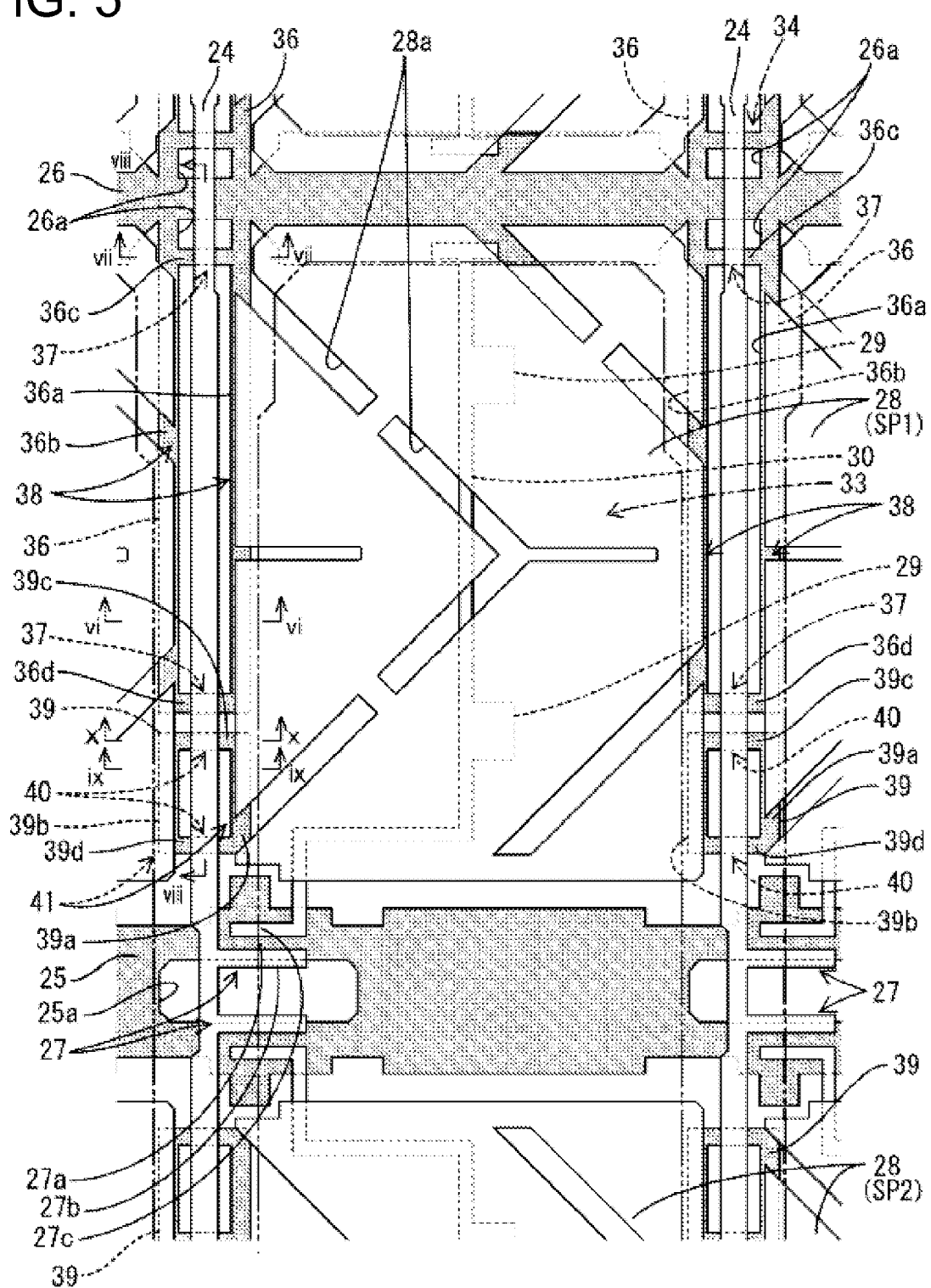
FIG. 5 is an enlarged view of FIG. 4.

The element substrate 20 is described in detail. As shown in FIGS. 4 and 5, the inner surface of the element substrate 20 (the side that faces the liquid crystal layer 22 and the opposite substrate 21) has thereon a number of source wires 24, which extend in the direction of column (vertical direction in FIG. 4) and which are disposed parallel to each other, a number of gate wires 25, which extend in the direction of row (horizontal direction in FIG. 4) or the direction perpendicular to the source wires 24 (crossing at a right angle with the source wires 24) and which are disposed parallel to each other, and a number of capacitance wires 26, which are disposed between the adjacent gate wires 25 and in parallel with the gate wires 25 and which are disposed parallel to each other. The gate wires 25 and the capacitance wires 26 are alternately disposed having approximately the same distances between each other. The gate wire 25, the source wire 24, and the capacitance wire 26 are made of metal films, which are patterned for the respective wires on the element substrate 20. The metal films have light-shielding properties.

At each of the intersections of the source wires 24 and the gate wires 25, a TFT (Thin Film Transistor) 27 is formed as a switching element that is connected to both of the wires. The TFT 27 is disposed on the gate wire 25, and a portion of the gate wire 25 serves as a gate electrode 27a. Scan signals are supplied to the gate wire 25 at a predetermined timing, and then supplied to the gate electrode 27a. Branch lines led out from the source wire 24 toward the TFT 27 overlaps the gate electrode 27a through a semiconductor film (not shown), for example, to constitute a source electrode 27b of the TFT 27. Image signals are input to the source wire 24 and then supplied to the source electrode 27b.

In regions enclosed by the source wire 24, the gate wire 25, and the capacitance wire 26, a number of pixel electrodes 28 are arranged in a matrix. A drain wire 30 is connected to the pixel electrode 28 through a contact hole 29. One end of the drain wire 30 is led out towards the TFT 27 to serve as a drain electrode 27c, which overlaps the gate electrode 27a through a semiconductor film (not shown), for example. The end portion of the pixel electrode 28 that is close to the capacitance wire 26 overlaps the capacitance wire 26 through a gate insulating film 31 and an interlayer insulating film 32 that are described below. This arrangement forms a capacitance between the end portion and the capacitance wire 26. In the pixel electrode 28, a plurality of slits 28a are formed to provide openings for controlling the orientation of liquid crystal molecules contained in the liquid crystal layer 22. The pixel electrode 28 is made of a transparent conductive film such as ITO (Indium Tin Oxide) or ZnO (Zinc Oxide).

Now, for the element substrate 20 according to this embodiment, one pixel, which is a display unit, is divided into two subpixels SP1 and SP2 that can be driven separately. More specifically, the two subpixels SP1 and SP2 that constitute one pixel are composed of two pixel electrodes 28 that are adjacent to each other in the direction of column, having the gate wire 25 as a divider. In other words, two pixel electrodes 28 that are adjacent to each other in the direction of column, having the capacitance wire 26 as a divider, constitute a subpixel SP1 of one pixel and subpixel SP2 of another pixel, respectively. Therefore, each capacitance wire 26 overlaps a first subpixel SP1 of one pixel and a second subpixel SP2 of another pixel. In the following description, a pixel electrode 28 disposed above the gate wire 25 in FIG. 4 is referred to as a "first subpixel SP1" and a pixel electrode 28 disposed under the same gate wire 25 in FIG. 4 is referred to as a "second subpixel SP2" for simplification. The first subpixel SP1 and the second subpixel SP2, which are arranged vertically in FIG. 4, are symmetric to each other with respect to the gate wire 25 as the symmetry axis, and are separate from each other.

Additionally, two TFT 27 are formed at each of the intersections of the gate wires 25 and the source wires 24, and are arranged vertically in FIG. 4 on the gate wire 25. On the gate wire 25, a slit 25a is formed as a divider between the two gate electrodes 27a. With the slit 25a, when one of the TFTs 27 fails, the repair can be easily conducted by isolating the failed TFT 27 from the gate wire 25. The two TFTs 27, which are arranged side by side on the gate wire 25, drive the first subpixel SP1 and the second subpixel SP2 that belong to the same pixel.

When the first subpixel SP1 and the second subpixel SP2 that belong to the same pixel are driven, the first subpixel SP1 and the second subpixel SP2 can be driven for different gray scales by adjusting the signal input to the capacitance wire 26. That is, the signal input to the capacitance wire 26 that overlaps the first subpixel SP1 and the signal input to another capacitance wire 26 that overlaps the second subpixel SP2 can be adjusted to achieve a target gray scale for that pixel by adding the gray scale of the first subpixel SP1 and that of the second subpixel SP2 and dividing the sum by two. In this way, a so-called multi-pixel drive can be conducted to provide a good viewing angle.

Figure 7:
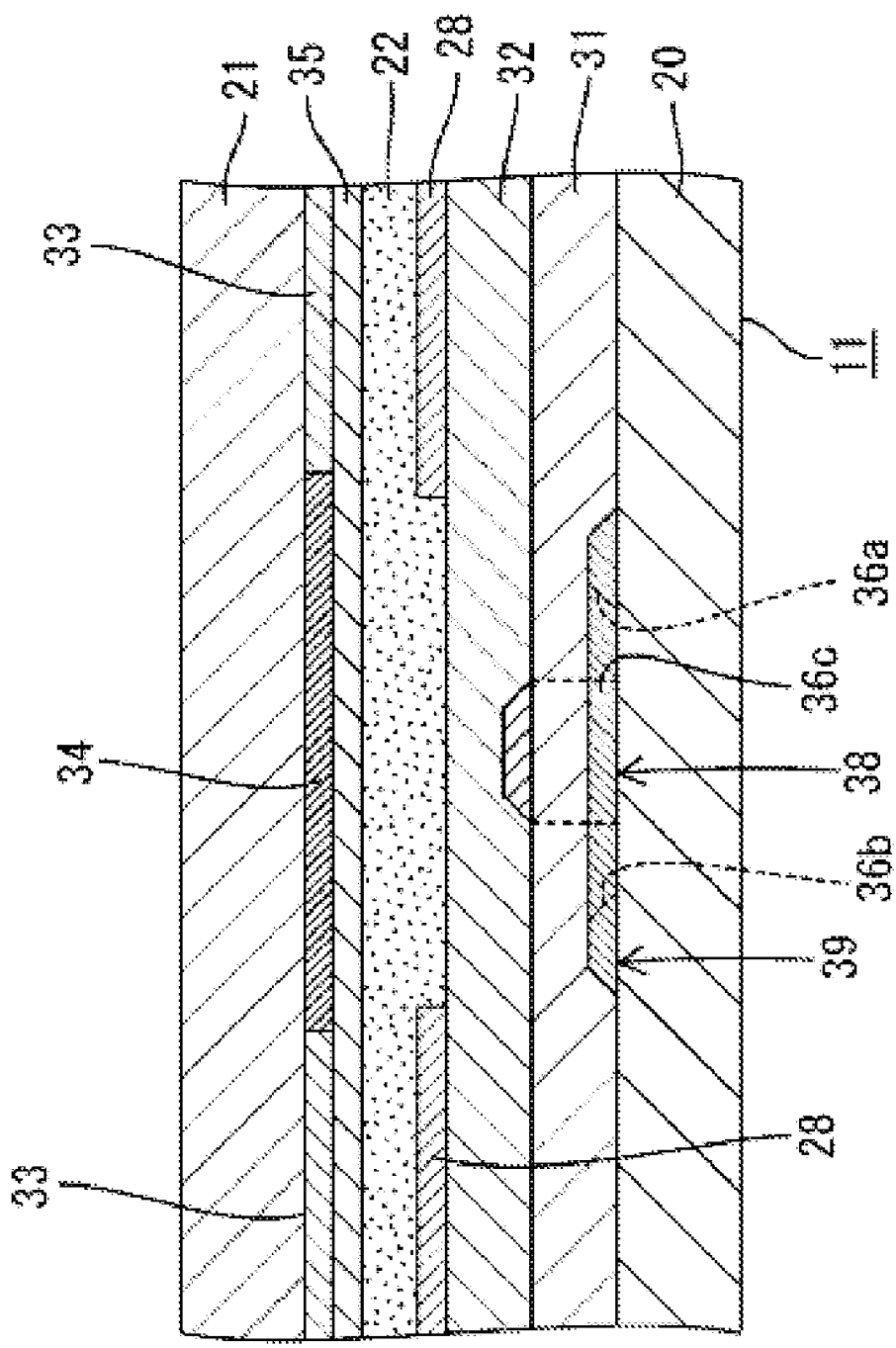
FIG. 7 is a cross-sectional view of the liquid crystal panel taken along the line vii-vii of FIG. 5.
Figure 8:
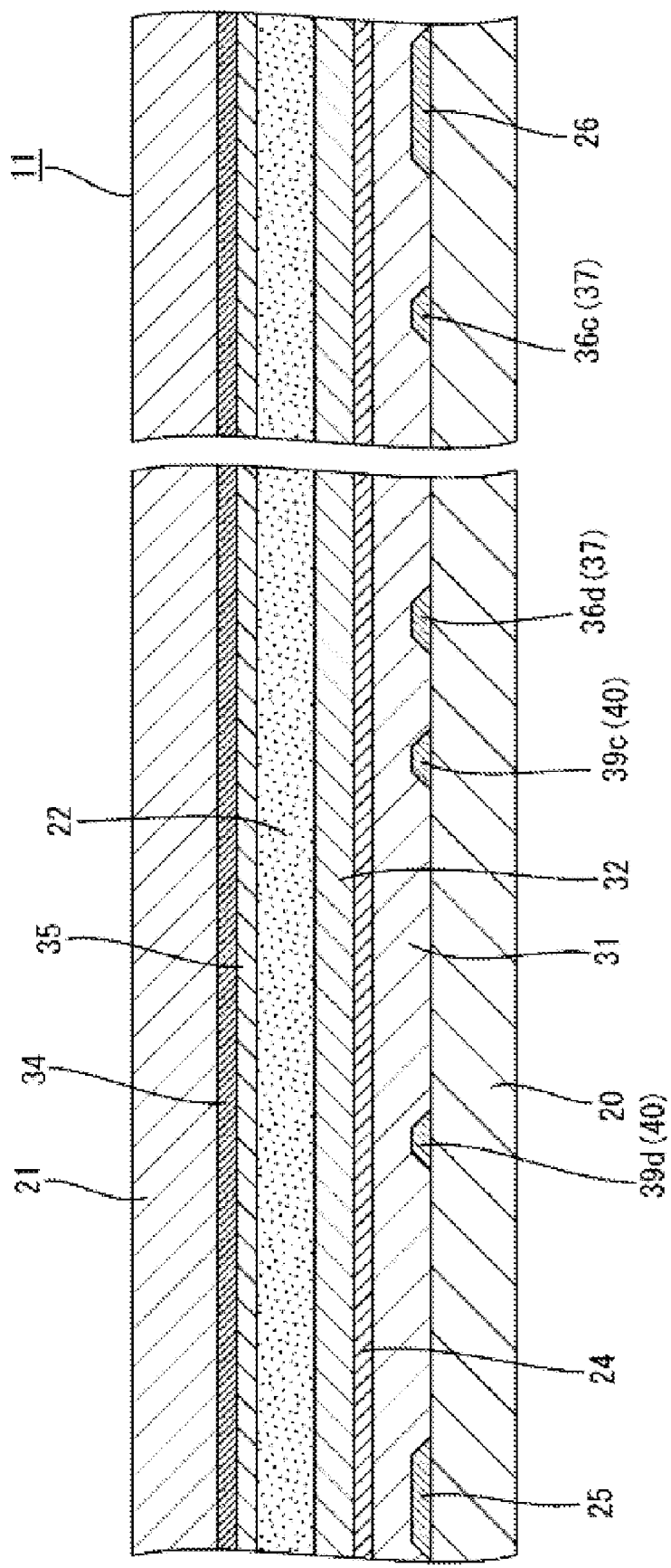
FIG. 8 is a cross-sectional view of the liquid crystal panel taken along the line viii-viii of FIG. 5.
Figure 9:
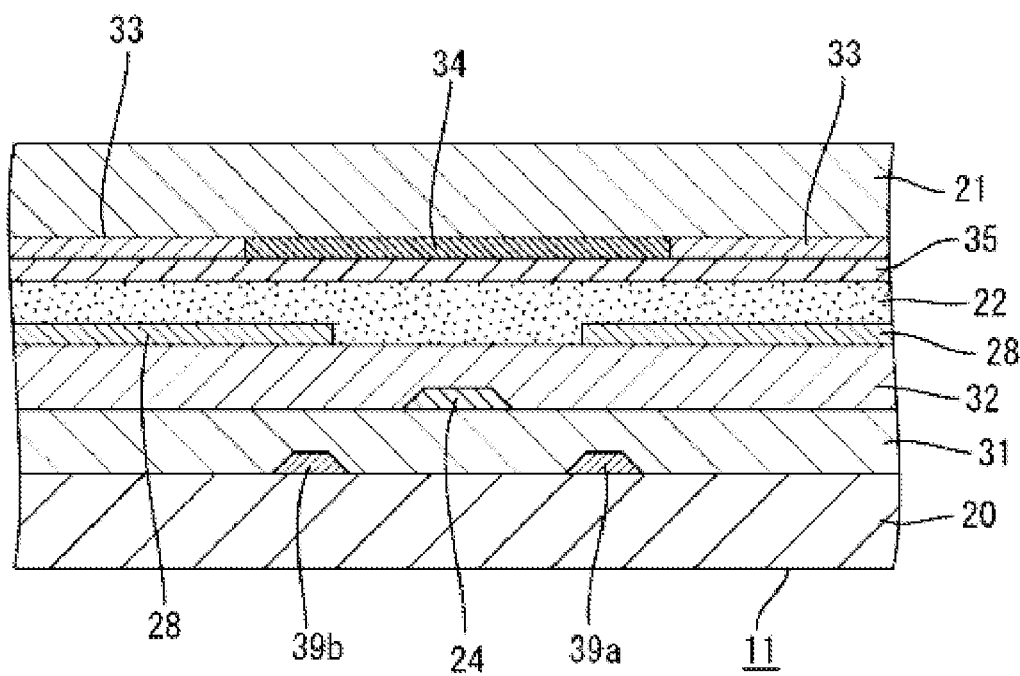
FIG. 9 is a cross-sectional view of the liquid crystal panel taken along the line ix-ix of FIG. 5.

Next, multilayer configuration of structural components disposed on the element substrate 20 is described. As shown in FIGS. 6 to 8, these components are, from the side close to the surface of the element substrate 20 to the liquid crystal layer 22, the gate wire 25 and the capacitance wire 26 as a first layer, the gate insulating film 31 as a second layer, the source wire 24 and the drain wire 30 as a third layer, the interlayer insulating film 32 (passivation film) as a fourth layer, a pixel electrode 28 as a fifth layer, and an alignment film (not shown) as a sixth layer, which are laminated sequentially. Of these components, the gate wire 25 and the capacitance wire 26 are both formed in the first layer on the element substrate 20, and are formed of the same material. Structural components belonging to the first layer are indicated as shaded areas in FIGS. 4, 5 and like figures. Similarly, the source wire 24 and the drain wire 30 are both formed in the third layer (the layer disposed over the gate wire 25 and the capacitance wire 26, through the gate insulating film 31) on the element substrate 20, and are formed of the same material. The end portion of the drain wire 30 that is on the side opposite from the drain electrode 27c overlaps the capacitance wire 26 through the gate insulating film 31 (see FIG. 4). The semiconductor film and other elements in TFT 27 that exist between the gate electrode 27a and the source drain electrode 27b, 27c are similar to the conventional ones, and therefore, their illustration in the drawings and description are omitted.

The gate insulating film 31, which is made of am insulating material such as silicon nitride (SiNx), for example, has the function of insulating the gate wire 25 and the capacitance wire 26 from the source wire 24 that intersects therewith. The interlayer insulating film 32, which is made of an insulating material such as silicon nitride (SiNx), for example, has the function of insulating the source wire 24 and the drain wire 30 from the pixel electrode 28. The alignment film, which is formed over almost the entire element substrate 20 and faces the liquid crystal layer 22, has the function of aligning the liquid crystal molecules.

Next, an opposite substrate 21 is described in detail. On the inner surface of the opposite substrate 21 (the side that faces the liquid crystal layer 22 and the element substrate 20), a number of color filters 33 are arranged in a matrix at positions corresponding to respective pixels on the element substrate 20, as shown in FIGS. 4 to 6. The area enclosed by chain double-dashed lines in FIGS. 4 and 5 is where the color filter 33 is formed. The color filter 33 has components of three colors, R (red), G (green), and B (blue), which are arranged in a repeated pattern. Each color filter 33 is formed for each pixel that is a display unit on the element substrate 20. More specifically, one color filter 33 is formed over an area that encompasses the first subpixel SP1 and the second subpixel SP2 across the gate wire 25 on the element substrate 20. In other words, the two subpixels SP1 and SP2 that constitute a pixel are covered (overlapped) by one color filter 33. The width of each color filter 33 is narrower than that of the pixel electrode 28, and part of the end portions of the pixel electrode 28 is outside the coverage of the color filter 33. In particular, the end portions of each color filter 33 that is proximal to the capacitance wire 26 are slightly narrowed on both ends, which leaves a relatively larger portion of the pixel electrode 28 extend beyond the coverage by the color filter 33.

Between each of the color filters 33, a light-shielding layer 34 (black matrix) is formed to prevent the colors from being mixed. Here, the area outside the area enclosed by the chain double-dashed lines in FIGS. 4 and 5 is where the light-shielding layer 34 is formed. The light-shielding layer 34 is formed to overlap the source wire 24, the capacitance wire 26, and the like on the element substrate 20 in a substantially grid-like pattern when observed in a plan view. The light-shielding layer 34 therefore overlaps a portion of each pixel electrode 28 that extend beyond the coverage by the color filter 33. The light-shielding layer 34 is formed along the outline of each color filter 33, and has wider portions where the color filter 33 has the narrowed portions. On the surfaces of the color filter 33 and the light-shielding layer 34, an opposite electrode 35 that faces the pixel electrodes 28 on the element substrate 20 is disposed. The opposite electrode 35 is made of a transparent conductive film such as ITO (Indium Tin Oxide), for example, and is formed over the entirety of the substrate. Also, on the surface of the opposite electrode 35, an alignment film (not shown) that aligns the liquid crystal molecules contained in the liquid crystal layer 22 is formed over the entirety of the substrate, similar to the formation of the opposite electrode 35.

From the capacitance wire 26, which is a component of the element substrate 20, branch wires 36 branch off and extend in parallel with the source wire 24, as shown in FIGS. 4 and 5. The branch wires 36 are formed in pairs and extend in both up-and-down vertical directions in FIG. 4 from the intersection of the capacitance wire 26 and the source wire 24. In other words, two pairs of the branch wires 36 extend from the capacitance wire 26, one pair for the subpixel SP1 of one pixel and another pair for the subpixel SP2 of another pixel. The branch lines that constitute a pair of branch wires 36 are branch lines 36a and 36b. The branching of the branch lines 36a and 36b occurs at two points on the capacitance wire 26 that sandwich the source wire 24. The branch lines 36a and 36b then extend approximately in parallel with the source wire 24 (in the direction of column) towards the gate wire 25 while partially overlapping the pixel electrode 28. More specifically, the portion of the branch lines 36a and 36b that overlaps the pixels electrode 28 is about two-thirds of the width from the side distal to the source wire 24. Therefore, a capacitance is formed between the branch wire 36 and the pixel electrode 28. The branch wire 36 is electrically connected to the capacitance wire 26 and therefore maintains the same potential. Therefore, the size of the capacitance formed between the capacitance wire 26 and the pixel electrode 28 increases in accordance with the size of the portion of the branch wire 36 that overlaps the pixel electrode 28.

Now, the technical significance of the branch wire 36 that overlaps the pixel electrode 28 is described below. On the element substrate 20, a capacitance is formed between the gate wire 25 and the pixel electrode 28 and also between the source wire 24 and the pixel electrode 28. Therefore, if the potential of the gate wire 25 or the source wire 24 changes when the pixel electrode 28 is charged and the TFT 27 is not conductive, the potential of the pixel electrode 28 can also change. For example, suppose that the variation in the potential of the gate wire 25 is $\Delta Vg$, the variation in the potential of the pixel electrode 28 is $\Delta Vd$, a capacitance formed between the gate wire 25 and the pixel electrode 28 is Cgd, and a capacitance of the entire pixel is Cpix, the following Formula 1 holds:

$$\Delta Vd = Cgd \times \Delta Vg / Cpix \qquad \text{Formula 1}$$

In the above formula, Cpix is the capacitance of the entire pixel, which is the sum of the capacitances formed between various components, such as Clc that is formed between the pixel electrode 28 and the opposite electrode 35, Ccs that is formed between the pixel electrode 28 and the capacitance wire 26 (including branch wire 36), Cgd that is formed between the gate wire 25 and the pixel electrode 28, and Csd that is formed between the source wire 24 and the pixel electrode 28. Therefore, Formula 2 below is obtained.

$$Cpix=(Clc+Ccs+Cgd+Csd+\ldots) \quad \text{Formula 2}$$

As described above, the capacitance wire 26 of this embodiment has the branch wire 36, which is formed to overlap the pixel electrode 28. Therefore, compared to cases in which the branch wire 36 are not present, the capacitance Ccs is larger by the amount corresponding to the area that the branch wire 36 overlaps the pixel electrode 28. This indicates that the branch wire 36 increases Cpix and reduces ΔVd. Therefore, by providing the branch wire 36 that overlaps the pixel electrode 28, the variation in the potential of the pixel electrode 28 can be favorably suppressed.

Furthermore, the branch wire 36 is formed to partially overlap the source wire 24 and can be used as a bypass when the source wire 24 breaks. More specifically, as shown in FIGS. 4 to 8, the branch wire 36 is composed of a pair of the branch lines 36a and 36b, which originate from the capacitance wire 26 and extend in the direction of column, and a pair of connecting lines 36c and 36d, which pass across the source wire 24 and connect the branch lines 36a and 36b. The branch wire 36, as a whole, is substantially loop-shaped and symmetric with respect to the source wire 24 as the symmetry axis. The connecting lines 36c and 36d are disposed parallel to the gate wire 25, or in other words, extend in the direction of row. In the following description, among the branch lines 36a and 36b, the one on the right in FIG. 4 is referred to as "first branch line 36a," and the one on the left in the figure is referred to as "second branch line 36b." Also, among the connecting lines 36c and 36d, the one close to the capacitance wire 26 is referred to as "first connecting line 36c," and the one close to the gate wire 25 is referred to as "second connecting line 36d."

Branch lines 36a and 36b are disposed a predetermined distance from the source wire 24a, and are linked to each other in the vicinity of the extended base end portion (the end portion proximal to the capacitance wire 26) by the first connecting line 36c, and are linked to each other at the extended leading end portion (the end portion proximal to the gate wire 25) by the second connecting line 36d. Slits 26a are formed between the first connecting line 36c and the main portion of the capacitance wire 26 as a divider. Slits 26a are also a divider that separates the two segments of the extended base end portion of the branch lines 36a and 36b. The width of the slit 26a opening is about the same as the space between the branch lines 36a and 36b. The branch lines 36a and 36b are terminated at the connecting line 36d.

Portions of the aforementioned connecting lines 36c and 36d that overlap the source wire 24 through the gate insulating film 31 (area between a pair of dashed lines in FIG. 7) is referred to as "source wire overlap portion 37." According to this configuration, a pair of the source wire overlap portions 37 is disposed apart from each other by a distance which is almost equivalent to the length of the branch lines 36a and 36b in the direction of the length of the source wire 24. On the other hand, of the branch wire 36, an area including the entire branch lines 36a and 36b and portions of the connecting lines 36c and 36d that do not overlap (or are offset from) the source wire 24 is referred to as "source wire non-overlap portion 38." The source wire non-overlap portions 38 are disposed in pairs with the source wire 24 interposed between them, and electrically connect the source wire overlap portions 37 together.

When the source wire 24 breaks at a point within a region where the branch wire 36 is disposed, portions of the branch line 36a or 36b of the branch wire 36 that define the slit 26a are irradiated with a laser for complete detachment of the branch wire 36 from the capacitance wire 26. The source wire overlap portion 37 of the branch wire 36 is also irradiated with a laser, and is short-circuited to the source wire 24. As a result, image signals input to the source wire 24 can be bypassed through the branch wire 36 and then be supplied beyond the breakage point BP (see FIG. 11).

As described above, the branch wire 36 overlaps the pixel electrode 28, does not overlap the color filter 33 on the opposite substrate 21, and overlaps the light shielding layer 34. The branch wire 36 is part of the capacitance wire 26 and is made of a material having light-shielding properties, which is the same as the material for the gate wire 25. However, since the branch wire 36 is arranged so as not to overlap the color filter 33, it does not interfere with the light passing through the color filter 33.

The extended leading end portion (end portion proximal to the gate wire 25) of the branch wire 36 is a predetermined distance (space) from the gate wire 25, and the distance is determined as described below. That is, the branch wire 36 and the gate wire 25 constitute the first layer and are also formed of the same material. As a result, when deviations occur in the patterns and/or positions of the gate wire 25 and the branch wire 36 due to a problem in manufacturing, a short-circuit may occur between the gate wire 25 and the branch wire 36. The distance between the branch wire 36 and the gate wire 25 is therefore set to be great enough to reliably avoid the possible short-circuit that could result from such a problem in manufacturing.

However, when the distance between the branch wire 36 and the gate wire 25 is set large enough as described above, there arises another problem that a breakage in a portion of the source wire 24 that is located between the branch wire 36 and the gate wire 25 cannot be repaired.

Therefore, in this embodiment, an auxiliary wire 39 that partially overlaps the source wire 24 is disposed between the branch wire 36 and the gate wire 25. With the auxiliary wire 39 in place, a breakage in a portion of the source wire 24 that cannot be accessed from the branch wire 36 as discussed above can be repaired. The auxiliary wire 39 is arranged "offset," i.e., disposed so as not to overlap the branch wire 36 or the gate wire 25.

More specifically, as shown in FIGS. 4, 5, 8, 9, and 10, the auxiliary wire 39 is composed of a pair of parallel lines 39a and 39b, which are parallel to the source wire 24, and a pair of cross lines 39c and 39d, which cross the source wire 24 and connect the parallel lines 39a and 39b together. This way, the auxiliary wire 39 as a whole is substantially loop-shaped and is symmetric with respect to the source wire 24 as the symmetry axis. The parallel lines 39a and 39b extend in the direction of column, and the cross lines 39c and 39d extend in the direction of row that is perpendicular to the parallel lines 39a and 39b (parallel to the gate wire 25). In the following description, of the parallel lines 39a and 39b, the one on the right in FIG. 4 is referred to as "first parallel line 39a" and the one on the left in the same figure is referred to as "second parallel line 39b." Of the cross lines 39c and 39d, the one close to the branch wire 36 is referred to as "first cross line 39c" and the one close to the gate wire 25 is referred to as "second cross line 39d."

The aforementioned parallel lines 39a and 39b are a predetermined distance from the source wire 24 and also positioned so that the axes of the parallel lines 39a and 39b nearly aligns with (are on the same line of) those of the aforementioned branch lines 36a and 36b of the branch wire 36. The line width of the parallel lines 39a and 39b is also about the same as that of the branch lines 36a and 36b. Of the ends of the parallel lines 39a and 39b, the ones proximal to the branch wire 36 are connected to each other with the first cross line 39c, and the ones proximal to the gate wire 25 are connected to each other with the second cross line 39d. The distance between the first cross line 39c and the branch wire 36 and the distance between the second cross line 39d and the closest portion of the gate wire 25 are about the same. Also, the parallel lines 39a and 39b terminate at the first cross line 39c, and the parallel lines 39a and 39b terminate at the second cross line 39d.

On the element substrate 20, the auxiliary wire 39 is formed in the first layer together with the gate wire 25 and the capacitance wire 26 and also is formed of the same material, which is a metallic film having the light-shielding properties, as the gate wire 25 and the capacitance wire 26. Therefore, the auxiliary wire 39 is formed in the same manufacturing process of the liquid crystal panel 11 as the gate wire 25 and the capacitance wire 26. Furthermore, a portion of the auxiliary wire 39 overlaps the source wire 24 through the gate insulating film 31.

Figure 10:
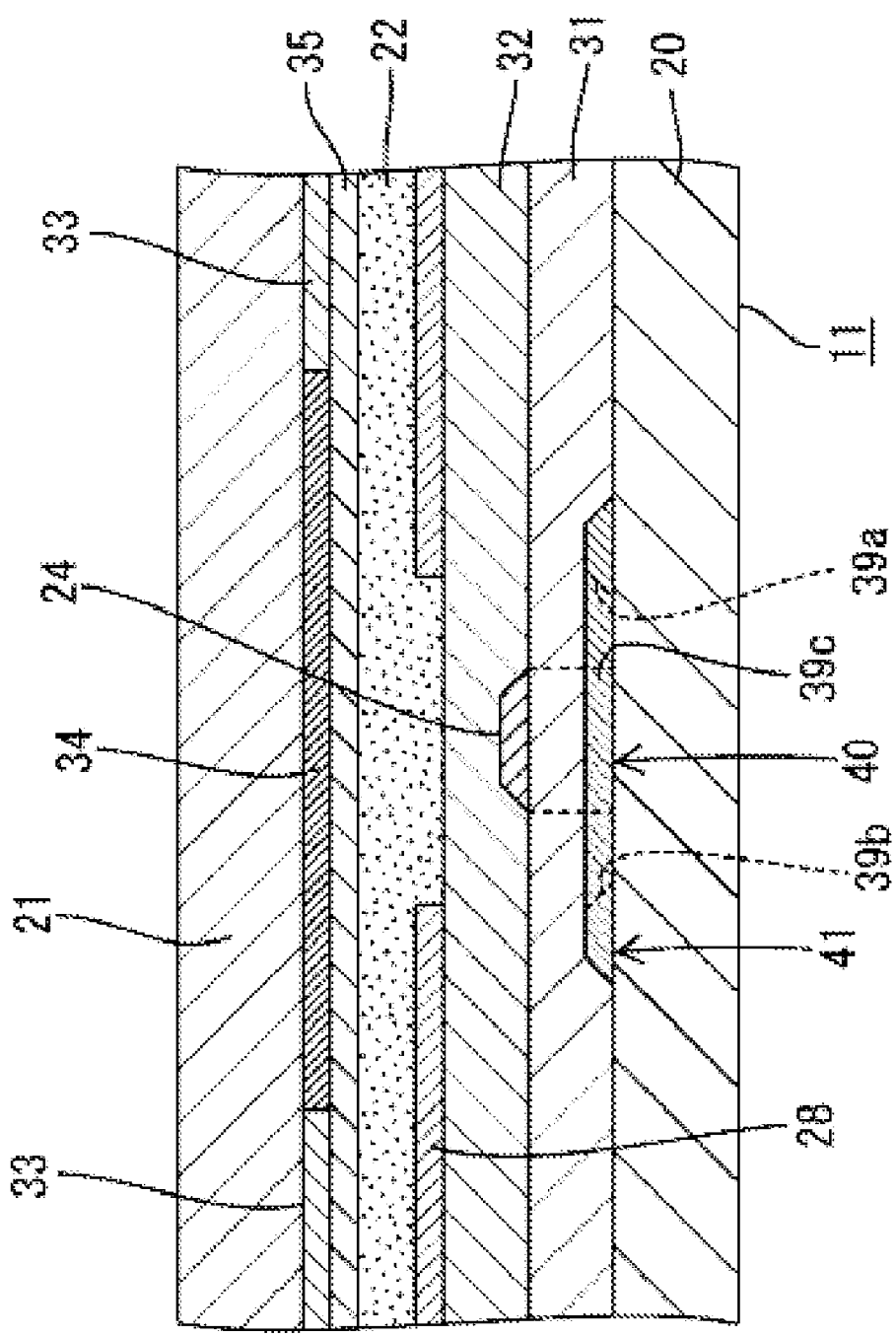
FIG. 10 is a cross-sectional view of the liquid crystal panel taken along the line x-x of FIG. 5.

More specifically, of the cross lines 39c and 39d that constitute the auxiliary wire 39, the portion that overlaps the source wire 24 through the gate insulating film 31 (area between a pair of dashed lines as shown in FIG. 10) is referred to as "source wire overlap portion 40." The two source wire overlap portions 40, which make a pair, are away from each other by a distance equivalent to the length of the parallel line 39a or 39b in the direction of length of the source wire 24. Of the auxiliary wire 39, the entire parallel lines 39a and 39b and portions of the cross lines 39c and 39d that do not overlap the source wire 24 is referred to as "source wire non-overlap portion 41." A pair of the source wire non-overlap portions 41 sandwich the source wire 24 in between and electrically connects the source wire overlap portions 40 to each other.

When the source wire 24 breaks at a point outside a region where the branch wire 36 is disposed and between the branch wire 36 and the gate wire 25, or more specifically, between the source wire overlap portions 40 of the auxiliary wire 39, the source wire overlap portions 40 of the auxiliary wire 39 are irradiated with a laser for short-circuiting to the source wire 24. As a result, an image signal input to the source wire 24 can be bypassed to the auxiliary wire 39 and then be supplied beyond the breakage point BP (see FIG. 12).

Also, as shown in FIG. 5, the auxiliary wire 39 is arranged so as not to overlap the color filter 33 on the opposite substrate 21, but to overlap the light-shielding layer 34. Although the auxiliary wire 39 is made of a material that has light-shielding properties, which is the same material as the material of gate wire 25 and the capacitance wire 26, the auxiliary wire 39 does not overlap the color filter 33. As a result, the auxiliary wire 39 does not interfere with light passage through the color filter 33. Here, the parallel lines 39a and 39b, which constitute the auxiliary wire 39, partially overlap the pixel electrode 28, or more specifically, overlap the pixel electrode 28 with approximately two-thirds of the width from the side distal to the source wire 24.

The present embodiment has the structure as described above. Now, an example of the manufacturing process of the liquid crystal panel 11 is described below. Generally, the manufacturing process of a liquid crystal panel 11 includes a step of manufacturing the element substrate 20 and a separate step of manufacturing the opposite substrate 21, and a step of sealing in the liquid crystal layer 22 between the substrates 20 and 21. The manufacturing process of the element substrate 20 of the liquid crystal panel 11 is described in detail below.

Using a known photolithography method, each of the structural components is sequentially formed and layered on the surface of the element substrate 20. Specifically, the gate wire 25, the capacitance wire 26 (including the branch wire 36), and the auxiliary wire 39 are formed as a first layer on the surface of the element substrate 20. Then, the gate insulating film 31 as a second layer, the source wire 24 and the drain wire 30 as a third layer, the interlayer insulating film 32 as a forth layer, the pixel electrode 28 as a fifth layer, and the alignment film as a sixth layer are sequentially formed thereon (see FIG. 6, for example). The element substrate 20 having the structural components thereon is thus obtained.

During and after the above-described manufacturing process of the element substrate 20, an inspection process is conducted as necessary to check for possible defects such as broken wires 24 to 26. If any defects are found during this inspection and if the defects are repairable, they are repaired following the inspection. During the inspection process, the wires 24 to 26 are visually inspected through the transparent element substrate 20 using an inspection light for the element substrate 20. Since the wires 24 to 26 are formed of metal films having light-shielding properties, any breakage in the wires can be detected by the light that passes through the breakage point. Here, instead of a visual inspection by an inspector, this inspection process may be conducted automatically by using an imaging element such as a camera.

As shown in FIG. 5, the branch wire 36 and the auxiliary wire 39 that are formed on the element substrate 20 overlap the source wire 24 only partially, and the most part of the wires does not overlap the source wire 24. If the branch wire 36 and the auxiliary wire 39 are arranged so as to overlap the source wire 24 over the entire length and width, any breakage in the source wire 24 may not be easily detected since the light passing through the breakage point BP is blocked by the branch wire 36 or the auxiliary wire 39, which has the light-shielding properties. Since the most part of the branch wire 36 and the auxiliary wire 39 according to this embodiment are the source wire non-overlap portions 38 and 41, i.e. the portions that do not overlap the source wire 24, the branch wire 36 and the auxiliary wire 39 are unlikely to interfere with the visual inspection. Consequently, the breakage point BP in the source wire 24 can be easily detected and identified.

Figure 11:
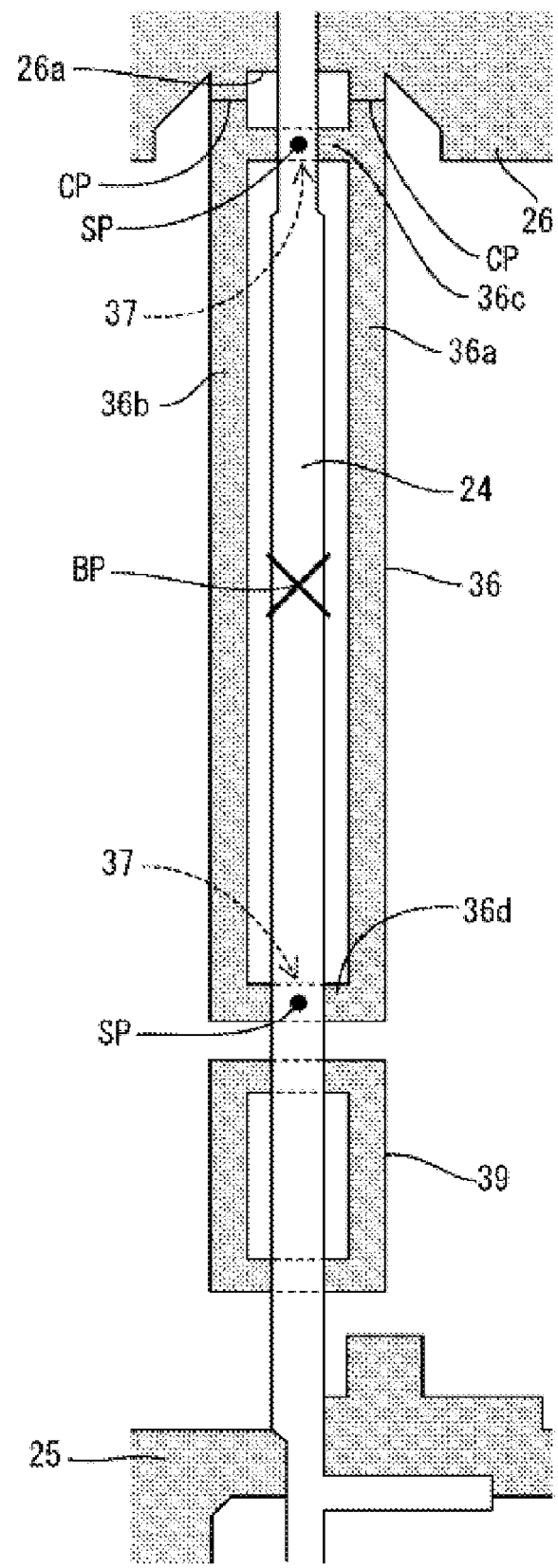
FIG. 11 is a plan view illustrating a method for repairing a broken source wire at a point in the region where the branch wire is formed.

Next, the procedure to be followed in the case that a breakage point BP is found in the source wire 24 is described below. Once the breakage point BP in the source wire 24 is detected and confirmed, the breakage is repaired. If the breakage point BP is identified to be located in the portion of the source wire 24 where the branch wire 36 is formed, or in other words, located between the connecting lines 36c and 36d that constitute the branch wire 36, as shown in FIG. 11, a portion of the branch lines 36a and 36b of the branch wire 36 that faces the slit 26a is irradiated with a laser across the width, for complete detachment of the branch wire 36 from the capacitance wire 26. As a result, a pair of cutting lines CP is formed on the branch wire 36. On the other hand, the source wire overlap portion 37 of the branch wire 36 is irradiated with a laser so that the source wire overlap portion 37 and the source wire 24 are fused together. This breaks the insulation provided by the gate insulating film 31 and short-circuits the branch wire 36 to the source wire 24. As a result, a pair of short-circuited points SP bridging the branch wire 36 and the source wire 24 is formed. With this procedure, image signals input to the source wire 24 are bypassed to the branch wire 36 so that the image signals are supplied to the source wire 24 beyond the breakage point BP.

Figure 12:
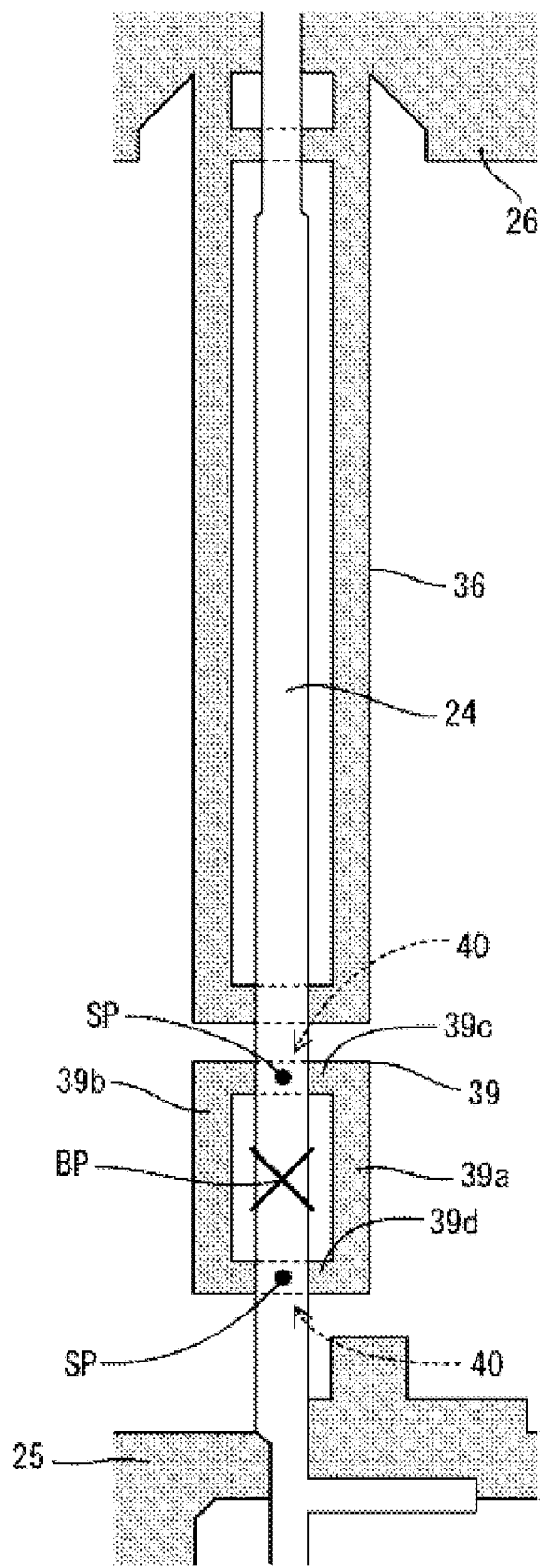
FIG. 12 is a plan view illustrating a method for repairing a broken source wire at a point in the region where the auxiliary wire is formed.

On the other hand, if the source wire 24 breaks at a point in the region where the branch wire 36 is not formed, that is, in the region where the auxiliary wire 39 is formed, or more specifically, between the cross lines 39c and 39d that constitute the auxiliary wire 39, the source wire overlap portions 40 of the auxiliary wire 39 are irradiated with a laser so that the source wire overlap portions 40 and the source wire 24 are fused together. This procedure breaks the insulation provided by the gate insulating film 31, and short-circuits the auxiliary wire 39 to the source wire 24, as shown in FIG. 12. As a result, a pair of short-circuited points SP bridging the auxiliary wire 39 and the source wire 24 is formed. With this procedure, image signals input to the source wire 24 are bypassed to the branch wire 39 so that the image signals are supplied to the source wire 24 beyond the breakage point BP. As described above, whether a breakage in the source wire 24 occurs inside or outside the region where the branch wire 36 is formed, the breakage can almost certainly be repaired. Product defect rate can thus be reduced.

Here, both the branch wire 36 and the auxiliary wire 39 are formed as the first layer on the element substrate 20, which therefore indicates that the positional relationship in the direction of layers between the source wire 24 and the branch wire 36, and between the source wire 24 and the auxiliary wire 39 are the same (see FIG. 8). Therefore, in the repair process, conditions such as laser output and laser irradiation period for short-circuiting the branch wire 36 and the source wire 24 are almost the same as in the case of short-circuiting the auxiliary wire 39 and the source wire 24. Consequently, when repairing the breakage in the source wire 24, the same conditions can be used for short-circuiting the source wire 24, regardless of whether the branch wire 36 or the auxiliary wire 39 is used. This provides great workability in the repair process.

Furthermore, both the branch wire 36 and the auxiliary wire 39 have a pair of the source wire non-overlap portions 38 and 41 and are substantially loop-shaped, thereby providing two different bypasses for the source wire 24 (see FIGS. 11 and 12). Therefore, even if a breakage occurs in either one of the source wire non-overlap portions 38 or 41, the image signal can still be supplied to the source wire 24 beyond the breakage point BP through the other source wire non-overlap portion 38 or 41. This means that the source wire 24 can reliably be repaired.

As described above, a liquid crystal panel 11 according to this embodiment include the element substrate 20 that has thereon the source wire 24; the gate wire 25, which intersects with the source wire 24; the TFT 27, which is provided in the vicinity of the intersection of the source wire 24 and the gate wire 25; the pixel electrode 28, which is connected to the TFT 27; the capacitance wire 26, which is disposed parallel to the gate wire 25 and forms a capacitance between itself and the pixel electrode 28; the branch wire 36, which originates from the capacitance wire 26, is disposed in parallel to the source wire 24, and at least partially overlaps the source wire 24 through the gate insulating film 31; and the auxiliary wire 39, which is disposed between the branch wire 36 and the gate wire 25 and in parallel to the source wire 24, and at least partially overlaps the source wire 24 through the gate insulating film 31.

If the source wire 24 breaks at a point in the region where the branch wire 36 is formed, the breakage can be repaired by utilizing the branch wire 36 as a bypass for the source wire 24. For the repair, branch wire 36 is detached from the capacitance wire 26, and portions of the branch wire 36 that overlap the source wire 24 are short-circuited to the source wire 24. If the source wire 24 breaks at a point between the branch wire 36 and the gate wire 25, the breakage can still be repaired by utilizing the auxiliary wire 39 as a bypass for the source wire 24. For the repair, portions of the auxiliary wire 39 that overlap the source wire 24 are short-circuited to the source wire 24. This way, occurrence of defective products due to the breakage of the source wire 24 can be prevented.

Further, by disposing the auxiliary wire 39 between the branch wire 36 originated from the capacitance wire 26 and the gate wire 25 and also by providing enough distance between the branch wire 36 and the gate wire 25, a direct short-circuiting between the branch wire 36 and the gate wire 25, which could result from deviations in the patterns and/or positions of the branch wire 36 and the gate wire 25 due to a problem in manufacturing process, is unlikely to occur. Short-circuit problems caused by the auxiliary wire 39 are extremely unlikely to occur, since the auxiliary wire 39 does not cause a short-circuit between the branch wire 36 and the gate wire 25 unless the auxiliary wire 39 short-circuits to both the branch wire 36 and the gate wire 25. The configuration described above, therefore, can prevent the occurrence of product defect caused by short-circuits between the branch wire 36 and the gate wire 25.

Furthermore, the auxiliary wire 39 is composed of the pair of source wire overlap portions 40, which overlaps the source wire 24 through the gate insulating film 31, and the source wire non-overlap portion 41, which connects the two source wire overlap portions 40 together and does not overlap the source wire 24. For the purpose of inspecting whether or not there is a breakage in the source wire 24, the element substrate 20 may be configured to have transmissive properties, so that any breakages in the source wire 24 can be visually identified through the element substrate 20. In this inspection procedure, the auxiliary wire 39 is unlikely to interfere with the visual inspection of the source wire 24 because the source wire non-overlap portion 41 of the auxiliary wire 39 does not overlap the source wire 24. This provides great workability in the repair process. This configuration is especially beneficial when the auxiliary wire 39 is formed of metallic material that has light-shielding properties.

Moreover, this configuration minimizes a capacitance that may be formed between the auxiliary wire 39 and the source wire 24, and therefore prevents any influence the capacitance might have to the displayed image.

The auxiliary wire 39 has a pair of source wire non-overlap portions 41 that sandwich the source wire 24 therebetween. With this configuration, the auxiliary wire 39 as a whole is substantially loop-shaped, and provides two different bypasses for the source wire 24. Therefore, if a breakage occurs in one of the source wire non-overlap portions 41, the source wire 24 can still be repaired using the other source wire non-overlap portion 41.

Further, the auxiliary wire 39 has a symmetric shape with respect to the source wire 24 as the symmetry axis. With the symmetric shape, when an electric field is generated between the source wire 24 and the auxiliary wire 39, the electric field takes on a symmetric form. Therefore, any influence that the electric field might have on the portion of pixel electrode 28 that is in proximity of the source wire 24 is balanced. That is, the electric field does not cause uneven effects on the displayed image and good image quality is maintained.

The auxiliary wire 39 is formed in the same layer as the branch wire 36 on the element substrate 20 and is arranged so as not to overlap the branch wire 36. With this configuration, the positional relationships between the branch wire 36 and the source wire 24 and between the auxiliary wire 39 and the source wire 24 in the direction of layers are the same. Therefore, when laser beam is used to short-circuit the overlapped portion of the branch wire 36 to the source wire 24 or to short-circuit the overlapped portion of the auxiliary wire 39 to the source wire 24, the same conditions for short-circuiting, such as the laser output and laser irradiation period, can be used. This provides great workability in the short-circuiting process.

The auxiliary wire 39 is formed of the same material as the branch wire 39. Using the same material allows the auxiliary wire 39 to be formed in the same process with branch wire 36 during a manufacturing process, which improves the production efficiency.

The branch wire 36 is composed of a pair of source wire overlap portions 37, which overlap the source wire 24 through the gate insulating film 31, and the source wire non-overlap portions 38, which connect the source wire overlap portions 37 together, but do not overlap the source wire 24. For the purpose of inspecting whether or not there is a breakage in the source wire 24, the element substrate 20 may be configured to have transmissive properties, so that any breakages in the source wire 24 can be visually identified through the element substrate 20. In this case, the auxiliary wire 39 is unlikely to interfere with the visual inspection of the source wire 24 because the source wire non-overlap portions 38 of the branch wire 36 do not overlap the source wire 24. This provides great workability in the inspection process. This configuration is especially beneficial when the branch wire 36 is formed of a metallic material that has light-shielding properties.

Additionally, this configuration minimizes a capacitance that may be formed between the branch wire 36 and the source wire 24, and therefore prevents any influence the capacitance might have to the displayed image.

Additionally, the source wire non-overlap portion 38 of the branch wire 36 is arranged so as to overlap the pixel electrode 28. With this configuration, a capacitance is formed between the source wire non-overlap portion 38 of the branch wire 36 that originates from the capacitance wire 26 and the pixel electrode 28.

Here, a capacitance is formed between the gate wire 25 and the pixel electrode 28, and also between the source wire 24 and the pixel electrode 28. Therefore, if the potential of the gate wire 25 or the source wire 24 changes when the pixel electrode 28 is charged and the TFT 27 is not conductive, the potential of the pixel electrode 28 could also change. The size of the potential change of the pixel electrode 28 tends to be inversely proportional to the size of the capacitance formed between the capacitance wire 26 and the pixel electrode 28. Therefore, by forming the capacitance between the source wire non-overlap portion 38 of the branch wire 36, which originates from the capacitance wire 26, and the pixel electrode 28, the capacitance formed between the capacitance wire 26 and the pixel electrode 28 can be increased accordingly. This way, variations in the potential of the pixel electrode 28 can be suppressed, and the display image quality is improved.

The branch wire 36 has a pair of source wire non-overlap portions 38 that sandwich the source wire 24 therebetween. With this configuration, the branch wire 36 as a whole is substantially loop-shaped, and provides two separate bypass routes for the source wire 24. Therefore, if a breakage occurs in one of the source wire non-overlap portions 38, the source wire 24 can still be repaired without fail using the other source wire non-overlap portion 38.

Additionally, the branch wire 36 is formed in a symmetric shape with respect to the source wire 24 as the symmetry axis. With the symmetric shape, when an electric field is generated between the source wire 24 and the branch wire 36, the electric field takes on a symmetric form. Therefore, any influence that the electric field might have on the portion of the pixel electrode 28 that is in proximity of the source wire 24 is balanced. That is, the electric field does not cause uneven effects on the displayed image, and good image quality is maintained.

The element substrate 20 and the opposite substrate 21 hold a liquid crystal layer therebetween; the opposite substrate 21 has thereon a plurality of color filters 33, which are arranged so as to overlap the pixel electrodes 28, and also has the light-shielding layers 34, which are disposed between the respective color filters 33; and the auxiliary wire 39 does not overlap the color filters 33, but overlaps the light-shielding layer 34. In this configuration, unlike the configuration in which the auxiliary wire 39 is arranged so as to overlap the color filters 33, the auxiliary wire 39 does not interfere with the light passage through the color filters 33, and therefore good image quality is maintained.

The auxiliary wire 39 is made of a material that has light-shielding properties. Therefore, even if film defects or the like occur in the light-shielding layer 34 on the opposite substrate 21, such defects can be covered by the auxiliary wire 39 made of a material that has light-shielding properties.

The element substrate 20 and the opposite substrate 21 hold a liquid crystal layer between them; the opposite substrate 21 has thereon a plurality of color filters 33, which are arranged so as to overlap the pixel electrodes 28, and also has light-shielding layers 34, which are disposed between the respective color filters 33; and the branch wire 36 does not overlap the color filters 33, but overlaps the light-shielding layer 34. In this configuration, unlike the configuration in which the branch wire 36 is arranged so as to overlap the color filters 33, the branch wire 36 does not interfere with light passage through the color filters 33, and therefore good image quality is maintained.

The branch wire 36 is made of a material that has light-shielding properties. Therefore, even if defects or the like occur in the light-shielding layer 34 on the opposite substrate 21, such defects can be covered by the branch wire 36 made of a material that has light-shielding properties.

Further, a liquid crystal display device 10 according to an embodiment of the present invention is composed of the aforementioned liquid crystal display panel 11 and a backlight device 12, which is capable of radiating light to the liquid crystal display panel 11. Since the liquid crystal panel 11 has a low defect rate, the manufacturing cost of the liquid crystal display device 10 can be reduced.

A television receiver according to an embodiment of the present invention is equipped with the liquid crystal display device 10 described above. Since the manufacturing cost of the liquid crystal display device 10 can be reduced, the manufacturing cost of the television receiver can also be reduced.

Embodiment 2

Embodiment 2 of the present invention is described below with reference to FIG. 13. In Embodiment 2, a formation width of the auxiliary wire 39-A is changed. Here, in Embodiment 2, the same reference numerals with additional "-A" at the end are used for structures similar to those described in the Embodiment 1. Redundant descriptions of the structure, operation, and effects are omitted.

Figure 13:
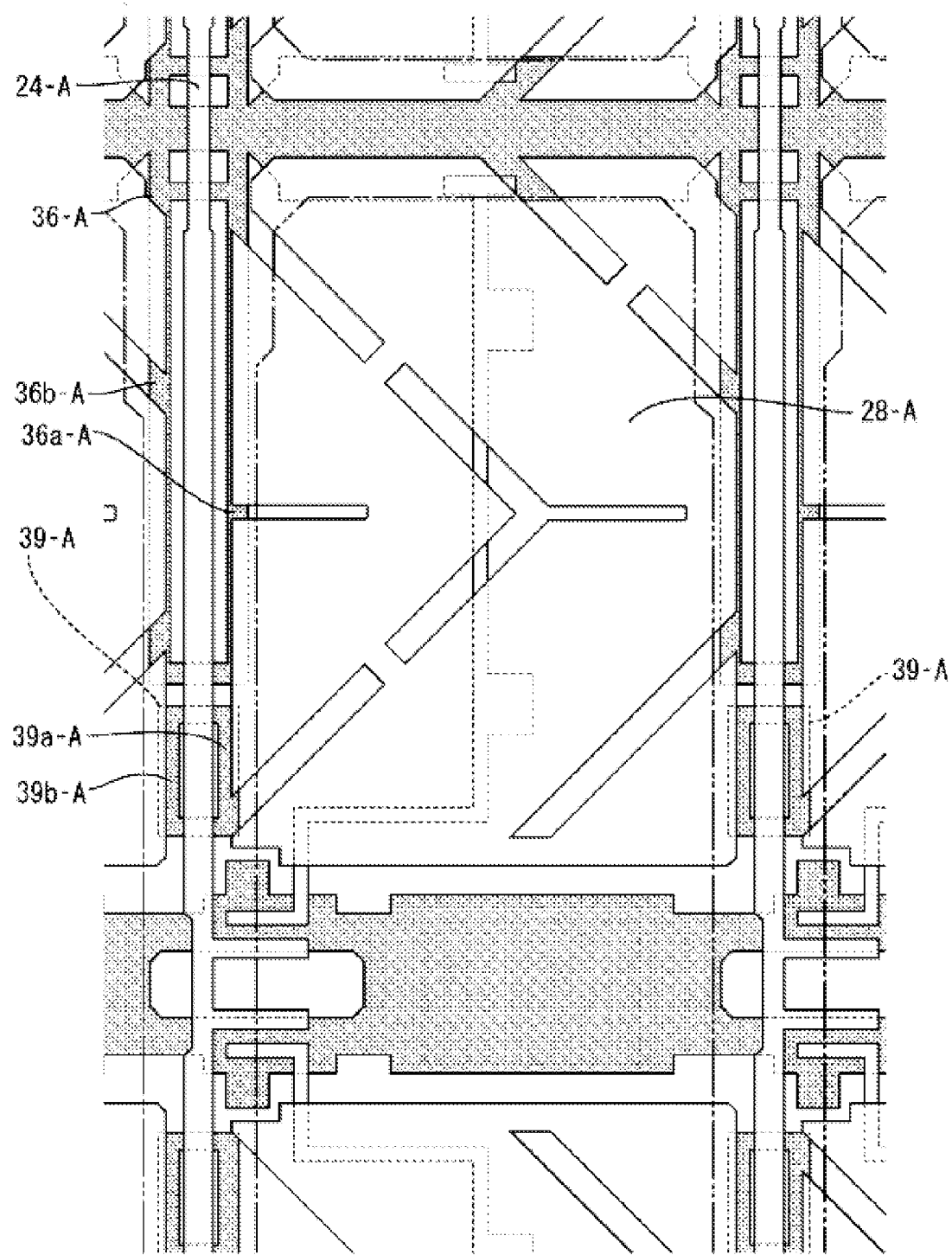
FIG. 13 is a plan view that shows a configuration of the element substrate according to Embodiment 2 of the present invention.

As shown in FIG. 13, an auxiliary wire 39-A has a formation width that is smaller than that of a branch wire 36-A. That is, parallel lines 39a-A and 39b-A, which constitute an auxiliary wire 39-A, are disposed closer to a source wire 24-A than branch wires 36a-A and 36b-A, which constitute the branch wire 36-A. Accordingly, this arrangement makes the width of the auxiliary wire 39-A smaller than that of the branch wire 36-A. Therefore, the width of an overlapped portion of the auxiliary wire 39-A and the pixel electrode 28-A is smaller than the width of an overlapped portion of the branch wire 36-A and the pixel electrode 28-A. As a result, the capacitance formed between the auxiliary wire 39-A and the pixel electrode 28-A can be reduced, which can also reduce the influence of the capacitance on the display image.

Embodiment 3

Embodiment 3 of the present invention is described below with reference to FIGS. 14 and 15. In Embodiment 3, the formation width of the auxiliary wire 39-B is different from that of the auxiliary wire of Embodiment 2. Here, in Embodiment 3, the same reference numerals with additional "-B" at the end are used for structures similar to those described in Embodiment 1. Redundant descriptions of the structure, operation, and effects are omitted.

Figure 14:
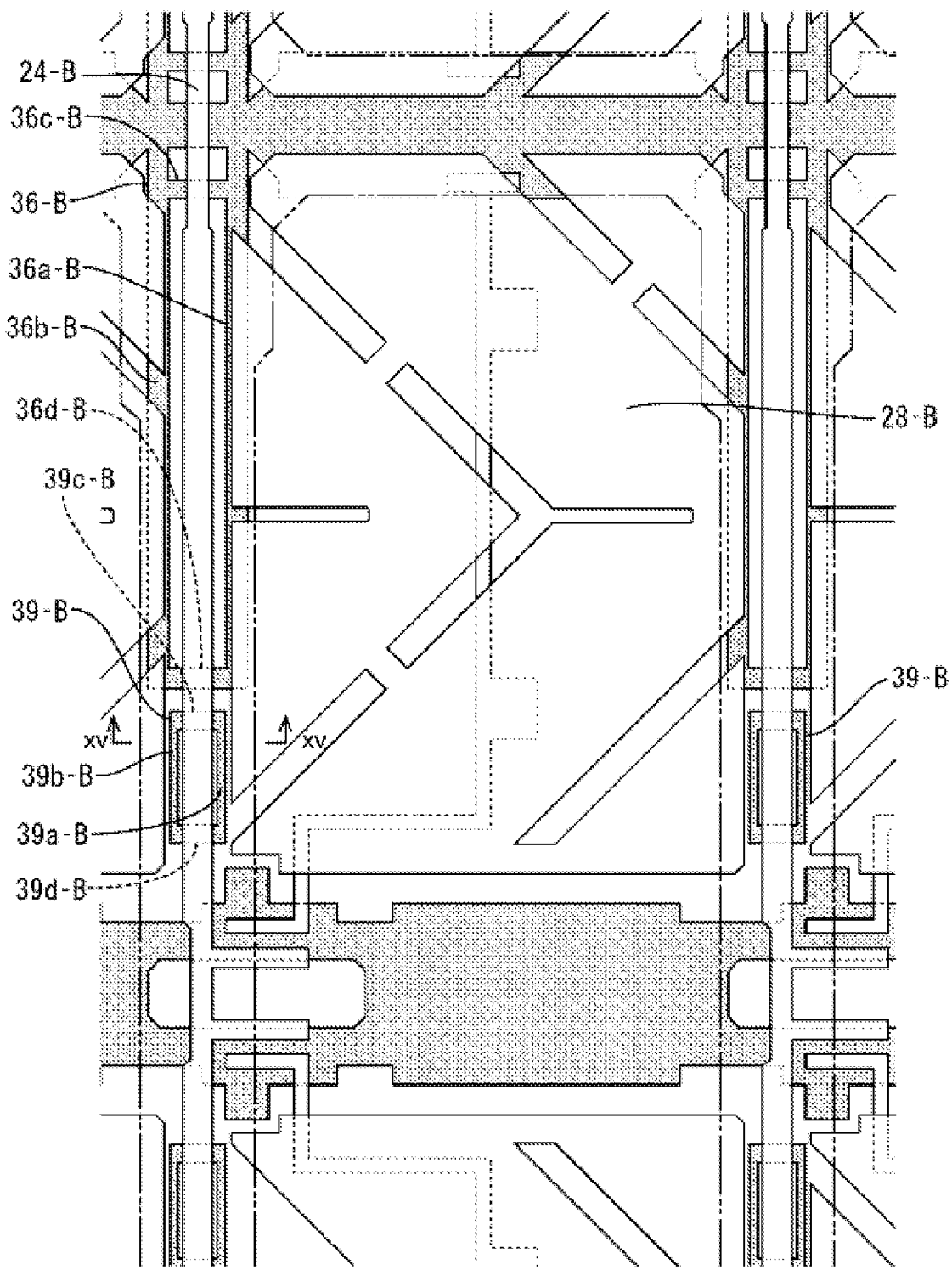
FIG. 14 is a plan view that shows a configuration of the element substrate according to Embodiment 3 of the present invention.
Figure 15:
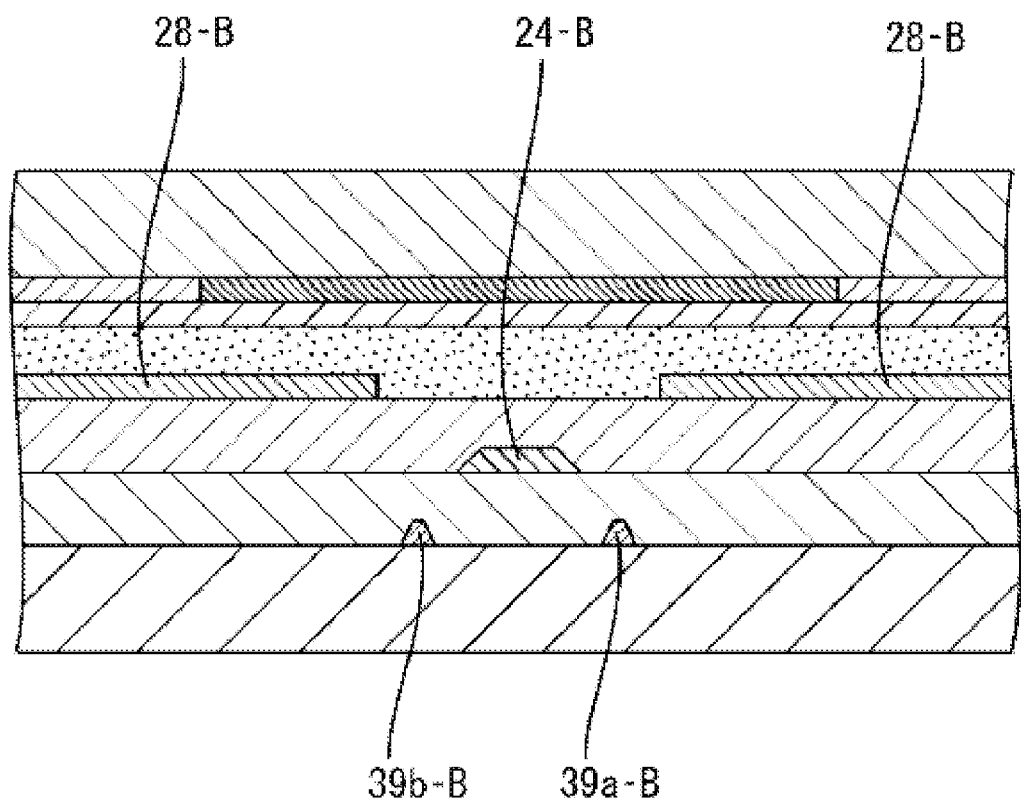
FIG. 15 is cross-sectional view of a liquid crystal taken along the line xv-xv of FIG. 14.

As shown in FIG. 14, an auxiliary wire 39-B has a formation width that is narrower than that in Embodiment 2. That is, the width of parallel lines 39a-B and 39b-B, which constitute an auxiliary wire 39-B, is smaller than the width of branch lines 36a-B and 36b-B, which constitute a branch wire 36-B, and the width of parallel lines 39a-B and 39b-B is also smaller than the distance between the source wire 24-B and the pixel electrode 28-B. As shown in FIG. 15, the auxiliary wire 39-B is arranged so as not to overlap (to be offset from) the pixel electrode 28-B over the entire area. As a result, the capacitance that could be formed between the auxiliary wire 39-B and the pixel electrode 28-B can be minimized. On the contrary, as shown in FIG. 14, the width of cross lines 39c-B and 39d-B of the auxiliary wire 39-B is about the same as the width of connecting lines 36c-B and 36d-B of the branch wire 36, in order to maintain the workability in the repair process using a laser beam.

According to this embodiment, as described above, the auxiliary wire 39-B is arranged so as not to overlap the pixel electrode 28-B. This configuration minimizes the capacitance that could be formed between the auxiliary wire 39-B and the pixel electrode 28-B, and reduces the influence of the capacitance on the displayed image.

Embodiment 4

Embodiment 4 of the present invention is described below with reference to FIG. 16. In Embodiment 4, the shapes of a color filter 33-C and a light-shielding layer 34-C are different from those of the color filter and the light shielding layer of Embodiment 3. Here, in Embodiment 4, the same reference numerals with additional "-C" at the end are used for structures similar to those described in the Embodiment 1. Redundant descriptions of the structure, operation, and effects are omitted.

Figure 16:
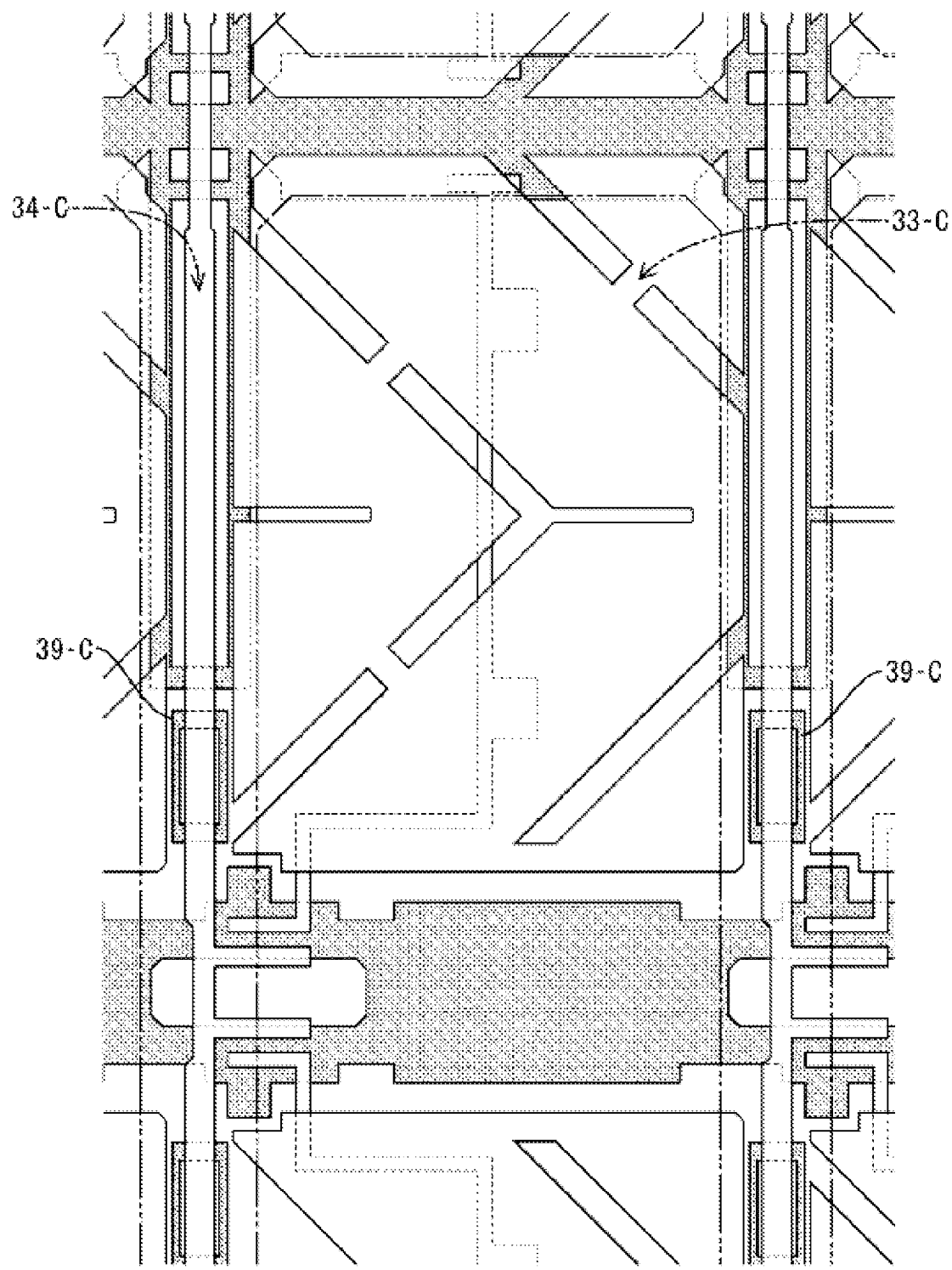
FIG. 16 is a plan view that shows a configuration of the element substrate according to Embodiment 4 of the present invention.

A color filter 33-C, as indicated by the chain double-dashed lines in FIG. 16, has approximately uniform width throughout the entire length. Therefore, a light-shielding layer 34-C, which is disposed between the respective color filters 33-C, is also formed in a grid pattern in which the grids have approximately a constant width.

Embodiment 5

Embodiment 5 of the present invention is described below with reference to FIG. 17. In Embodiment 5, the width of an auxiliary wire 39-D is different from that of the auxiliary wire of Embodiment 4. Here, in Embodiment 5, the same reference numerals with additional "-D" at the end are used for structures similar to those described in Embodiment 1. Redundant descriptions on the structure, operation, and effects are omitted.

Figure 17:
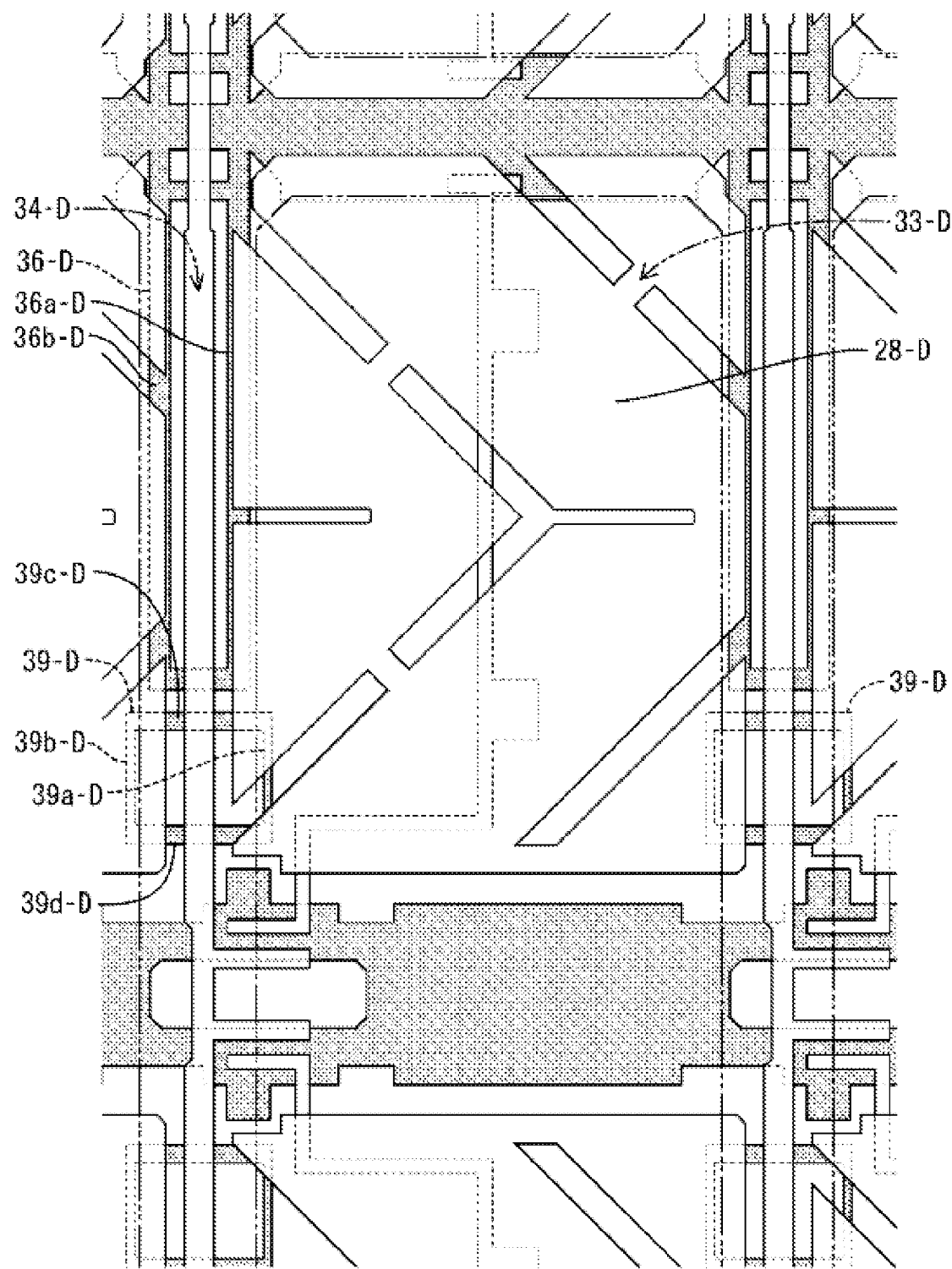
FIG. 17 is a plan view that shows a configuration of the element substrate according to Embodiment 5 of the present invention.

As shown in FIG. 17, an auxiliary wire 39-D has a formation width that is greater than that of a branch-wire 36-D. That is, parallel lines 39a-D and 39b-D, which constitute the auxiliary wire 39-D, are offset towards the pixel electrode 28-D so as not to overlap branch lines 36a-D and 36b-D, which constitute the branch wire 36-D. Accordingly, the length of the cross lines 39c-D and 39d-D increases. Therefore, the cross lines 39c-D and 39d-D partially overlap the pixel electrode 28-D. The parallel lines 39a-D and 39b-D and part of the cross lines 39c-D and 39d-D extend inward beyond a light-shielding layer 34-D, which is on the opposite substrate, and therefore overlap a color filter 33-D (see the chain double-dashed lines in FIG. 17).

Embodiment 6

Embodiment 6 of the present invention is described below with reference to FIG. 18. In Embodiment 6, the shape of an auxiliary wire 39-E is different from that of the auxiliary wire of Embodiment 1. Here, in Embodiment 6, the same reference numerals with additional "-E" at the end are used for structures similar to those described in Embodiment 1. Redundant descriptions of the structure, operation and effects are omitted.

Figure 18:
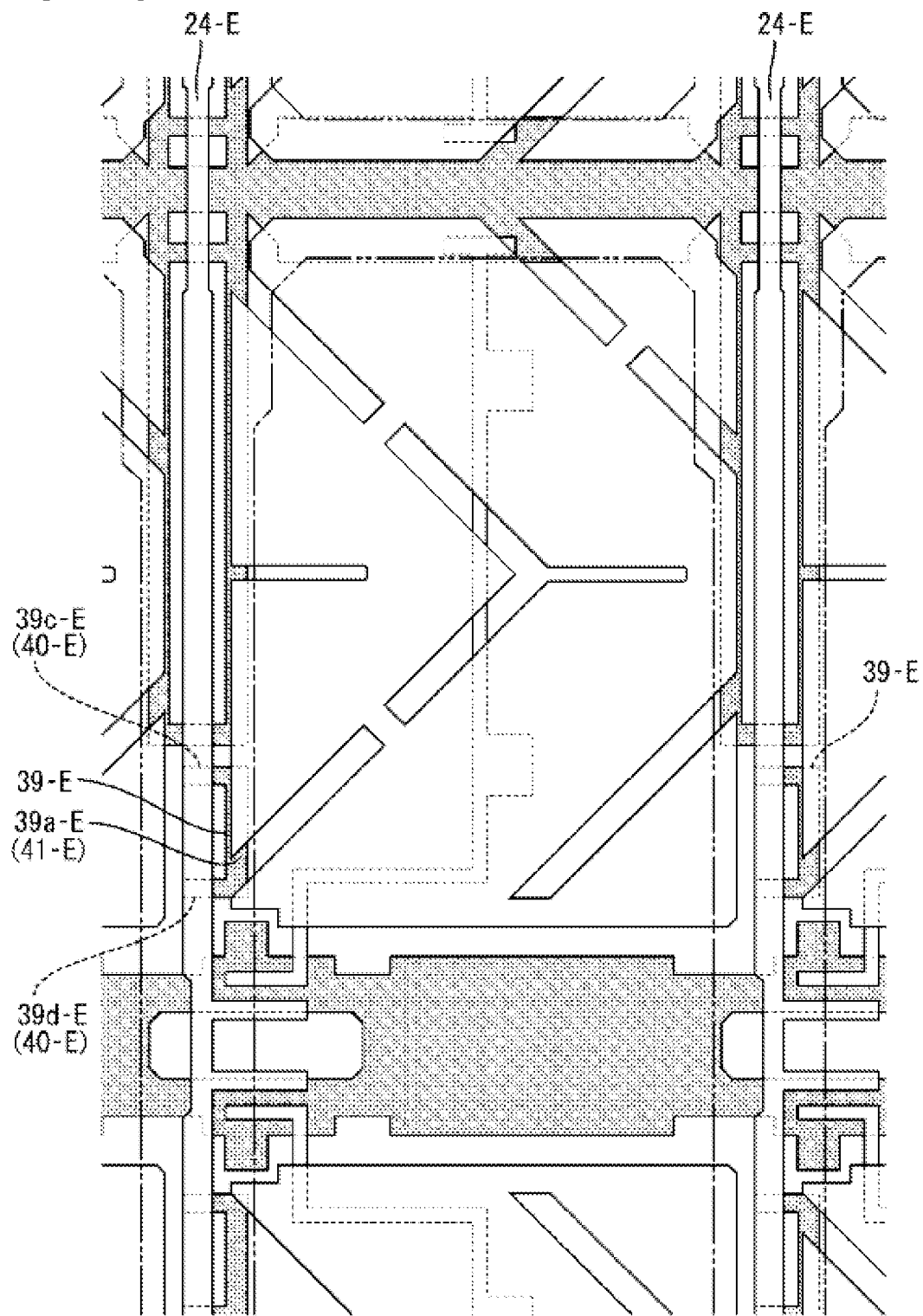
FIG. 18 is a plan view that shows a configuration of the element substrate according to Embodiment 6 of the present invention.

As shown in FIG. 18, an auxiliary wire 39-E is composed of a pair of cross lines 39c-E and 39d-E, which run across a source wire 24-E and extend in the direction of row, and a parallel line 39a-E, which is connected to the cross lines 39c-E and 39d-E and extends along a source wire 24-E (in the direction of column). More specifically, the parallel line 39a-E is equivalent to the first parallel line 39a in Embodiment 1 and is offset to the right so as not to overlap the source wire 24-E. Ends of the parallel line 39a-E in the direction of length are connected to the cross lines 39c-E and 39d-E, respectively. The cross lines 39c-E and 39d-E extend from the parallel line 39a towards the source wire 24-E, and the extended ends of the cross lines overlap the source wire 24-E through a gate insulating film to form source wire overlap portions 40-E. The source wire overlap portions 40-E, which make a pair, are disposed away from each other by a distance that is approximately the length of the parallel line 39a-E. Of the auxiliary wire 39-E, the portion including the entirety of the parallel line 39a-E and portions of the cross lines 39c-E and 39d-E that are offset from the source wire 24-E constitute a source wire non-overlap portion 41-E. That is, in this embodiment, only one source wire non-overlap portion 41-E, which is electrically connected to the both source wire overlap portions 40-E, is formed. Also, the auxiliary wire 39-E is symmetric with respect to the direction of row but asymmetric with respect to the direction of column.

Embodiment 7

Embodiment 7 of the present invention is described below with reference to FIG. 19. In Embodiment 7, the shape of a branch wire 36-F is different from that of the branch wire of Embodiment 1. Here, in Embodiment 7, the same reference numerals with additional "-F" are used for structures similar to those described in Embodiment 1. Redundant descriptions of the structure, operation, and effects are omitted.

Figure 19:
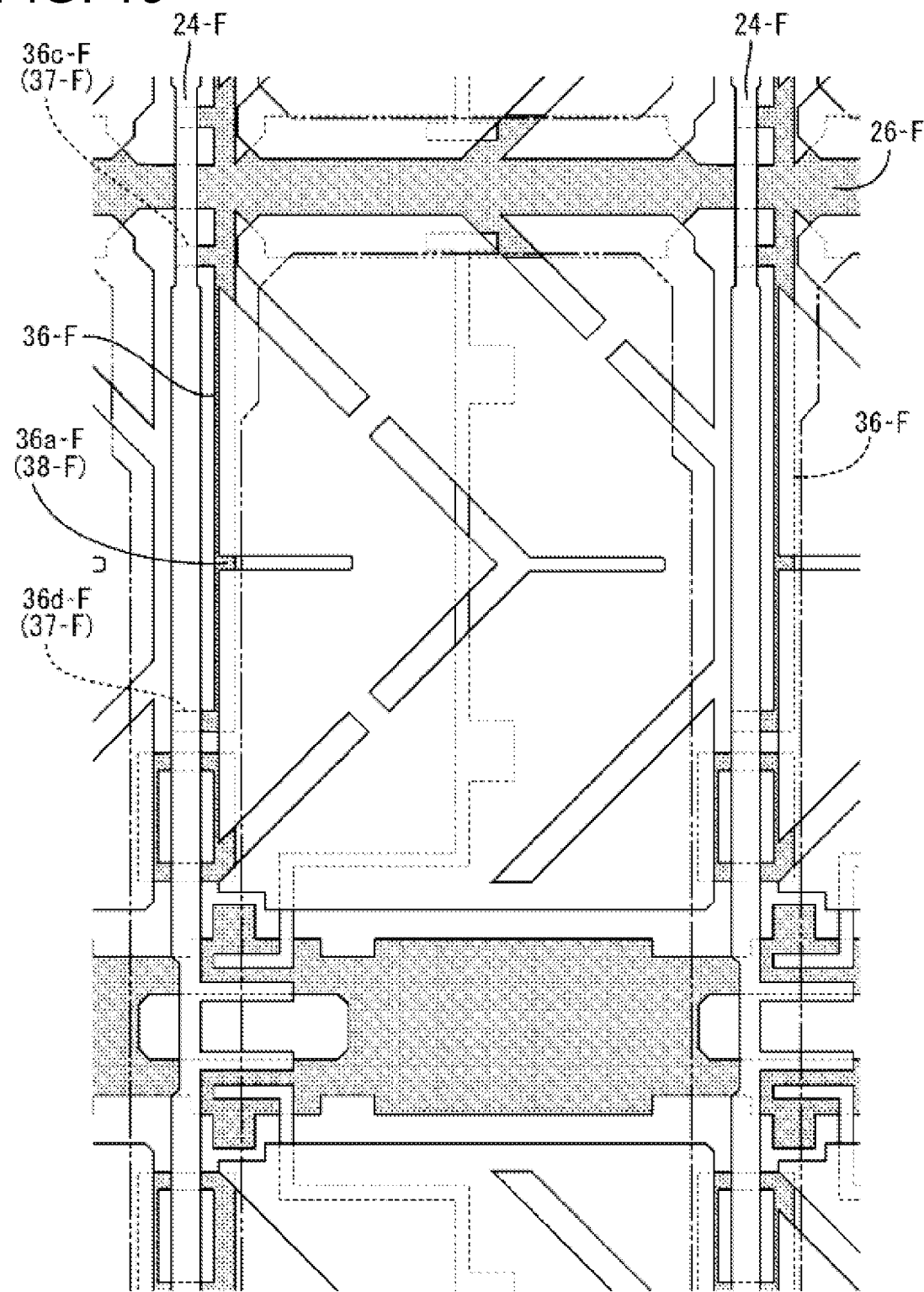
FIG. 19 is a plan view that shows a configuration of the element substrate according to Embodiment 7 of the present invention.

As shown in FIG. 19, a branch wire 36-F is composed of a pair of connecting lines 36c-F and 36d-F, which run across a source wire 24-F and extend in the direction of row, and a branch line 36a-F, which is connected to the connecting lines 36c-F and 36d-F and extends along the source wire 24-F (in the direction of column). More specifically, the branch line 36a-F corresponds to the first branch line 36a in Embodiment 1 and is offset to the right in FIG. 19 so as not to overlap the source wire 24-F. The vicinity of an extended base end portion of the branch line 36a-F and an extended leading end portion thereof are connected to the connecting lines 36c-F and 36d-F, respectively. The connecting lines 36c-F and 36d-F extend from the branch line 36a-F towards the source wire 24-F, and the extended ends of the connecting lines overlap the source wire 24-F through a gate insulating film to form source wire overlap portions 37-F. The source wire overlap portions 37-F, which make a pair, are disposed away from each other by a distance that is approximately the length of the branch line 36a-F. Of the branch wire 36-F, a portion including the entirety of the branch line 36a-F and portions of the connecting lines 36c-F and 36d-F that are offset from the source wire 24-F constitute a source wire non-overlap portion 38-F. That is, in this embodiment, only one source wire non-overlap portion 38-F, which is electrically connected to the both source wire overlap portions 37-F, is formed. Also, the branch wire 36-F is asymmetric with respect to both the direction of row and the direction of column. Here, when a repair is performed by detaching the branch wire 36-F from the capacitance wire 26-F, the branch line 36a-F of the branch wire 36-F can be cut by a laser beam at a point located between the first connecting line 36c-F and the capacitance wire 26-F.

Embodiment 8

Embodiment 8 of the present invention is described below with reference to FIGS. 20 and 21. In Embodiment 8, the shape of an auxiliary wire 39-G is different from that of the auxiliary wire in Embodiment 6. Here, in the Embodiment 8, the same reference numerals with additional "-G" are used for structures similar to those described in Embodiment 1. Redundant descriptions of the structure, operation and effects are omitted.

Figure 20:
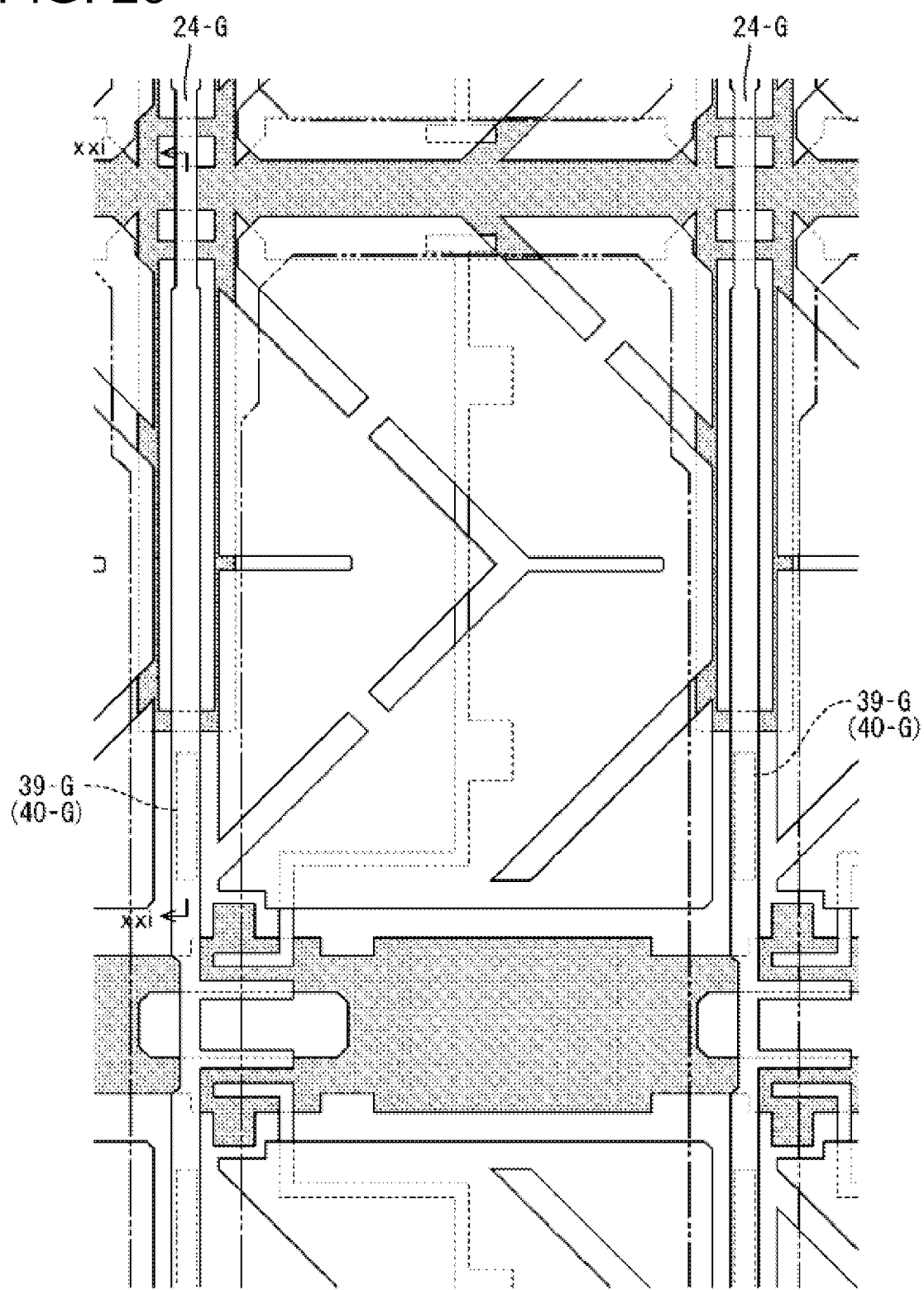
FIG. 20 is a plan view that shows a configuration of the element substrate according to Embodiment 8 of the present invention.
Figure 21:
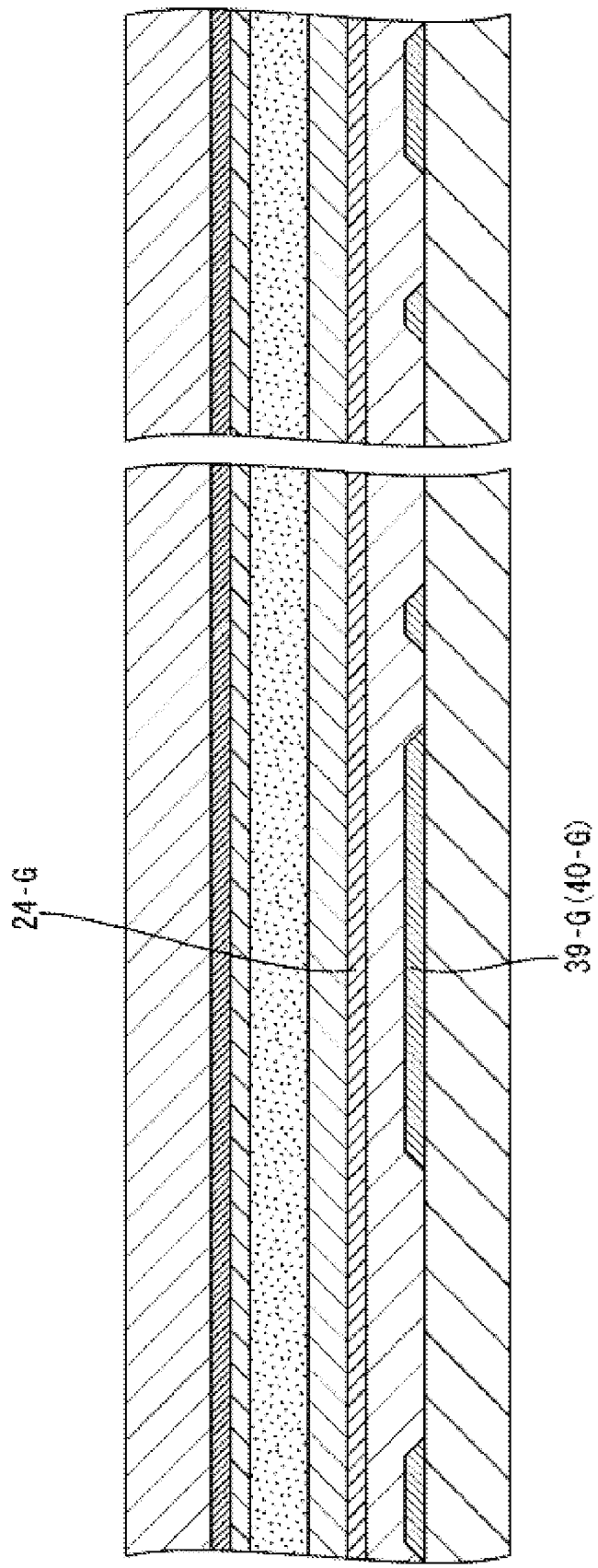
FIG. 21 is a cross-sectional view of a liquid crystal panel taken along the line xxi-xxi of FIG. 20.

As shown in FIGS. 20 and 21, the auxiliary wire 39-G is formed in a straight line that extends along a source wire 24-G (in the direction of column). The auxiliary wire 39-G overlaps the source wire 24-G through a gate insulating film over the entire length and width of the auxiliary wire 39-G. Therefore, the entirety of the auxiliary wire 39-G is a source wire overlap portion 40-G and there is no source wire non-overlap portion in which the auxiliary wire is offset from (does not overlap) the source wire 24-G. When the source wire 24-G breaks at a point where the auxiliary wire 39-G is formed, the auxiliary wire 39-G is irradiated with laser at two points, which are apart in the direction of column and encompass the breakage point, to form two points to be short-circuited to the source wire 24-G. This way, the auxiliary wire 39-G can be utilized as a bypass route for the source wire 24-G.

Embodiment 9

Embodiment 9 of the present invention is described below with reference to FIG. 22. In Embodiment 9, the shape of a branch wire 36-H is different from Embodiment 7. Here, in Embodiment 9, the same reference numerals with additional "-H" at the end are used for structures similar to those described in Embodiment 1. Redundant descriptions of the structure, operation, and effects are omitted.

Figure 22:
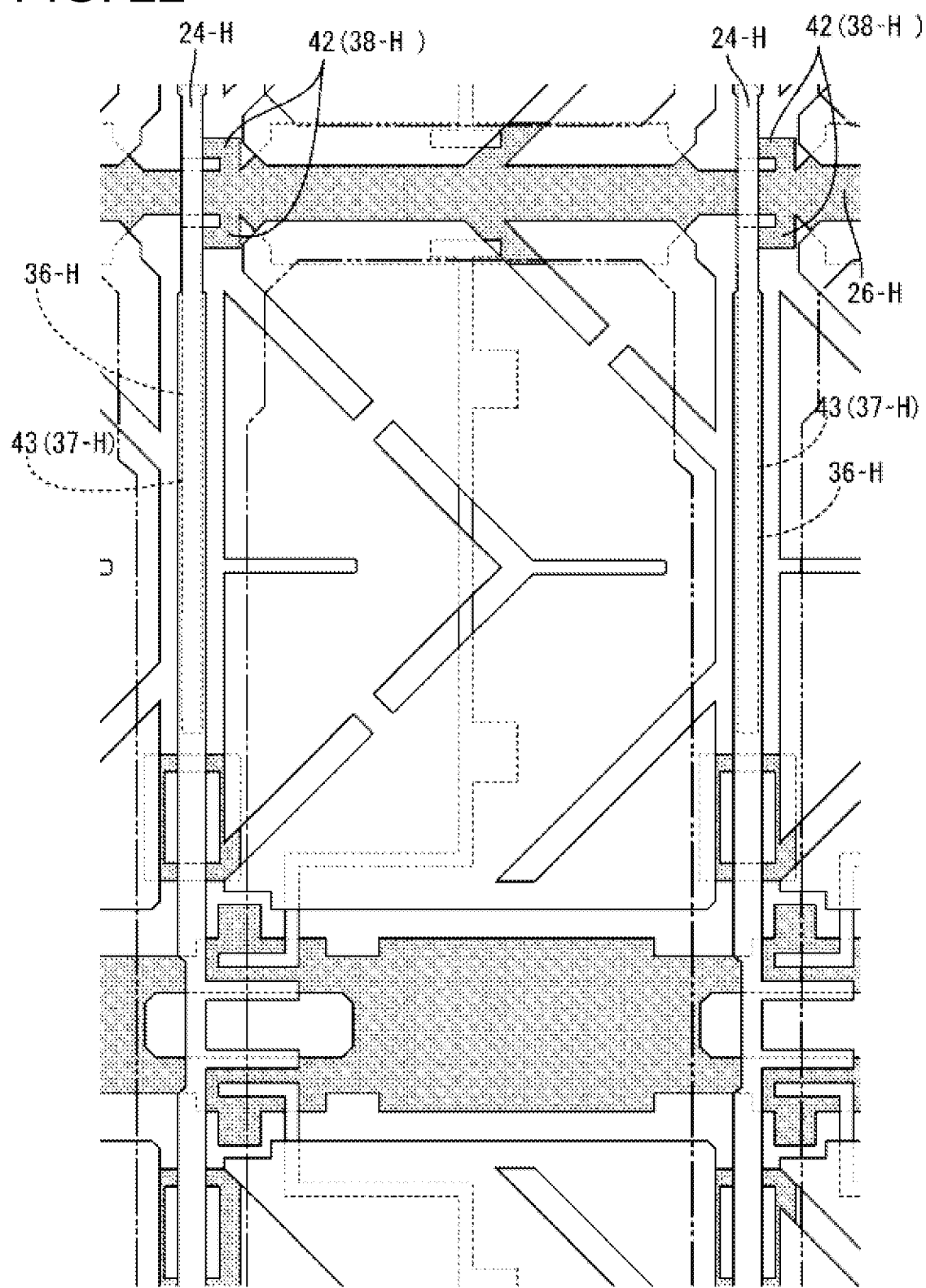
FIG. 22 is a plan view that shows a configuration of the element substrate according to Embodiment 9 of the present invention.

As shown in FIG. 22, a branch wire 36-H has a structure in which a led-out line 42, which is led out from a capacitance wire 26-H, is connected to a parallel line 43, which is a straight line extending along a source wire 24-H (in the direction of column). More specifically, the led-out line 42 extends from the capacitance wire 26-H by a predetermined distance in the direction of column, at a location which is offset from the source wire 24-H, and then extends towards the source wire 24-H, making a L-shaped path when observed in a plan view. The parallel line 43 overlaps the source wire 24-H through a gate insulating film over the entire length and width of the parallel line 43. The end of the parallel line 43 that is proximal to the capacitance wire 26-H is connected to the aforementioned led-out line 42. Therefore, the entirety of the parallel line 43 of the branch wire 36-H is a source wire overlap portion 37-H, and the entirety of the led-out line 42 is a source wire non-overlap portion 38-H, which does not overlap the source wire 24-H. When the source wire 24-H breaks at a point within a region where the branch wire 36-H is formed, the led-out line 42 is cut off by laser to isolate the branch wire 36-H from the capacitance wire 26-H, and the branch wire 36-H is irradiated with laser at two points, which are apart from each other in the direction of column and encompass the breakage point, to form two points to be short-circuited to the source wire 24-H. This way, the branch wire 36-H can be utilized as a bypass for the source wire 24-H.

Other Embodiments

The present invention is not limited to the embodiments described above with reference to figures. Other embodiments, such as those described below, for example, also fall within the scope of the present invention.

(1) In Embodiments 1 through 7 and Embodiment 9 described above, the auxiliary wire having a source wire non-overlap portion also has a pair of source wire overlap portions. Such an auxiliary wire having a source wire non-overlap portion may have three or more source wire overlap portions. The point is that an auxiliary wire having a source wire non-overlap portion may function properly as long as the auxiliary wire has at least a pair of source wire overlap portions. Therefore, the number of the source wire overlap portions may be changed as appropriate.

(2) In the embodiments described above, the auxiliary wire is formed on the element substrate in the same layer as the gate wire and the capacitance wire. The auxiliary wire, however, may be made of a transparent conductive film such as ITO and formed in the same layer as the pixel electrode, for example. An auxiliary wire made of a transparent material is beneficial in that it is unlikely to interfere with inspections for broken source wires. Such auxiliary wire is appropriate in particular when the entire auxiliary wire overlaps the source wire as in Embodiment 8.

(3) When the auxiliary wire is formed in the same layer as the pixel electrode, as described in (2) above, the auxiliary wire is insulated from the gate wire and the capacitance wire (including branch wire) by the interlayer insulating film 32. Therefore, the auxiliary wire can be arranged so as to overlap the gate wire and the capacitance wire (especially branch wire). This configuration expands the region in which the auxiliary wire can be formed in the direction of column, which also expands the range of the source wire where breakage is repairable with the auxiliary wire. This further reduces the defect rate.

(4) The layer in which the auxiliary wire is formed is not limited to one of the existing layers on the element substrate described above. In embodiments other than those described above, the auxiliary wire may be formed in a new, dedicated layer on the element substrate. This configuration expands the range of possible materials for the auxiliary wire.

(5) In the embodiments described above, one auxiliary wire is disposed between the branch wire and the gate wire. However, two or more auxiliary wires may be provided between the branch wire and the gate wire, and the number of the auxiliary wires to be provided may be modified as appropriate.

(6) In embodiments other than those described above, the auxiliary wire may have a loop shape and be of asymmetric form.

(7) In embodiments other than those described above, the shape and size of the auxiliary wire may be changed as appropriate.

(8) In Embodiments 1 through 8, the branch wire has a pair of source wire overlap portions. However, the branch wire may have three or more source wire overlap portions, and the number of the source wire overlap portions may be changed as appropriate.

(9) In embodiments other than those described above, a branch wire may have a loop shape and be of asymmetric form.

(10) In embodiments other than those described above, the shape and size of the branch wire may be changed as appropriate.

(11) In the embodiments described above, the branch wire is disposed at a position offset from the color filter, but a configuration in which the branch wire is arranged so as to overlap the color filter also falls in the scope of the present invention.

(12) In the embodiments described above, the branch wire overlaps the pixel electrode, but a configuration in which the branch wire does not overlap the pixel electrode also falls in the scope of the present invention.

(13) In the embodiments described above, the liquid crystal display device employs TFTs as switching elements. However, the present invention is also applicable to a liquid crystal display device using switching elements other than TFTs (such as Thin Film Diode (TFD)), and may also be applicable to a black-and-white liquid crystal display device as well as a color liquid crystal display device.

(14) In the embodiments described above, the liquid crystal display device uses a liquid crystal panel as the display panel, but the present invention is also applicable to a display device using other types of display panel.

(15) In the embodiments described above, a cold cathode fluorescent lamp is used as a light source for a backlight device, but configurations in which other type of linear (tubular) light source such as hot cathode fluorescent lamp is used also fall within the scope of the present invention. In addition to linear light sources, point light sources such as LEDs (Light Emitting Diode) may be used as well.

(16) In the embodiments described above, a television receiver equipped with a tuner is discussed as an example, but the present invention is also applicable to a display device that is not equipped with a tuner.

The invention claimed is:

1. A display panel comprising, on a substrate:
   a signal wire;
   a gate wire disposed to intersect with said signal wire;
   a switching element provided in vicinity of an intersection of said signal wire and said gate wire;
   a pixel electrode connected to said switching element;
   a capacitance wire disposed in parallel with said gate wire to form a capacitance with said pixel electrode;
   a branch wire branching off from said capacitance wire, arranged parallel to said signal wire, wherein at least a portion of the branch wire overlaps said signal wire through an insulating layer; and
   an auxiliary wire disposed between said branch wire and said gate wire, arranged parallel to said signal wire, wherein at least a portion of the auxiliary wire overlaps said signal wire through an insulating layer.

2. The display panel according to claim 1, wherein said auxiliary wire comprises a pair of signal wire overlap portions overlapping said signal wire through said insulating layer, and a signal wire non-overlap portion arranged so as to connect said pair of signal wire overlap portions together and so as not to overlap said signal wire.

3. The display panel according to claim 2, wherein said auxiliary wire includes a pair of said signal wire non-overlap portions at positions that sandwich said signal wire therebetween.

4. The display panel according to claim 3, wherein said auxiliary wire is symmetric with respect to said signal wire as a symmetry axis.

5. The display panel according to claim 1, wherein said auxiliary wire is formed in a same layer as said branch wire on said substrate and is arranged so as not to overlap said branch wire.

6. The display panel according to claim 5, wherein said auxiliary wire is formed of a same material as said branch wire.

7. The display panel according to claim 1, wherein said auxiliary wire is arranged so as not to overlap said pixel electrode.

8. The display panel according to claim 1, wherein said branch wire comprises a pair of signal wire overlap portions arranged so as to overlap said signal wire through said insulating layer, and a signal wire non-overlap portion arranged so as to connect said signal wire overlap portions and so as not to overlap said signal wire.

9. The display panel according to claim 8, wherein said signal wire non-overlap portion of said branch wire is arranged so as to overlap said pixel electrode.

10. The display panel according to claim 9, wherein said branch wire includes said pair of signal wire non-overlap portions at positions that sandwich said signal wire in between.

11. The display panel according to claim 10, wherein said branch wire is formed in a symmetric form with respect to said signal wire as a symmetry axis.

12. The display panel according to claim 1, further comprising an opposite substrate that, together with said substrate, sandwiches and holds a liquid crystal layer in between.

13. The display panel according to claim 12, wherein a plurality of color filters arranged to overlap said pixel electrode and a light-shielding layer arranged between the respective color filters are formed on said opposite substrate, and
   wherein said auxiliary wire is arranged so as not to overlap said color filters, but to overlap said light-shielding layer.

14. The display panel according to claim 13, wherein said auxiliary wire is made of a material that has light-shielding properties.

15. The display panel according to claim 12, wherein a plurality of color filters arranged so as to overlap said pixel electrodes and a light-shielding layer arranged between the respective color filters are formed on said opposite substrate, and
   wherein said branch wire is arranged so as not to overlap said color filters, but to overlap said light-shielding layer.

16. The display panel according to claim 13, wherein said branch wire is made of a material having light-shielding properties.

17. A display device comprising:
the display panel according to claim 1; and
an illumination device capable of radiating light to said display panel.

18. A television receiver comprising the display device according to claim 17.

* * * * *